US011800097B2

(12) United States Patent
Nasrallah et al.

(10) Patent No.: US 11,800,097 B2
(45) Date of Patent: Oct. 24, 2023

(54) METHOD FOR IMAGE PROCESSING AND APPARATUS FOR IMPLEMENTING THE SAME

(71) Applicant: ATEME, Velizy Villacoublay (FR)

(72) Inventors: Anthony Nasrallah, Puteaux (FR); Thomas Guionnet, Rennes (FR); Mohsen Abdoli, Thorigne Fouillard (FR); Marco Cagnazzo, Gif sur Yvette (FR); Attilio Fiandrotti, Turin (IT)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 17/517,878

(22) Filed: Nov. 3, 2021

(65) Prior Publication Data
US 2022/0141460 A1  May 5, 2022

(30) Foreign Application Priority Data

Nov. 3, 2020 (EP) .................... 20306318

(51) Int. Cl.
H04N 19/00 (2014.01)
H04N 19/117 (2014.01)
(Continued)

(52) U.S. Cl.
CPC .......... H04N 19/117 (2014.11); G06N 3/08 (2013.01); G06T 9/002 (2013.01); H04N 19/105 (2014.11);
(Continued)

(58) Field of Classification Search
CPC .. H04N 19/117; H04N 19/105; H04N 19/139; H04N 19/176; G06N 3/08; G06T 9/002
See application file for complete search history.

(56) References Cited

U.S. PATENT DOCUMENTS 6,272,261 B1 * 8/2001 Matsuoka ............. G06T 3/4007
382/300
8,705,622 B2  4/2014 Ye et al.
(Continued)

OTHER PUBLICATIONS

Chen et al., "The Joint Exploration Model (JEM) for Video Compression With Capability Beyond HEVC," IEEE Transactions on Circuits and Systems for Video Technology, 2019, vol. 30(5), pp. 1208-1225.
(Continued)

Primary Examiner — Zhihan Zhou
(74) Attorney, Agent, or Firm — Faegre Drinker Biddle & Reath LLP

(57) ABSTRACT

A method of processing a first image in a first plurality of images, wherein the first image is divided into a plurality of pixel blocks, is proposed, which comprises, for a current block of the first image: selecting, in a set of a plurality of predefined interpolation filters, an interpolation filter based on a prediction of an interpolation filter determined by a supervised learning algorithm to which data related to the current block is input; and using the selected interpolation filter for calculating fractional pixel values in a second image of the plurality of images for a temporal prediction of pixels of the current block based on a reference block correlated to the current block in the second image, wherein the second image is distinct from the first image and was previously encoded according to an image encoding sequence for encoding the images of the plurality of images.

19 Claims, 10 Drawing Sheets

(51) Int. Cl.
    H04N 19/105    (2014.01)
    H04N 19/139    (2014.01)
    H04N 19/176    (2014.01)
    G06N 3/08      (2023.01)
    G06T 9/00      (2006.01)
(52) U.S. Cl.
    CPC ......... H04N 19/139 (2014.11); H04N 19/176 (2014.11)

(56) References Cited

U.S. PATENT DOCUMENTS

| | | | | |
|---|---|---|---|---|
| 2018/0288419 | A1* | 10/2018 | Yu | H04N 19/132 |
| 2021/0227243 | A1* | 7/2021 | Wu | H04N 19/42 |
| 2022/0256169 | A1* | 8/2022 | Siddaramanna | H04N 19/46 |

OTHER PUBLICATIONS

Dony et al., "Neural Network Approaches to Image Compression," Proceedings of the IEEE, Feb. 1995, vol. 83 (2), pp. 288-303.

Goodfellow et al., "Deep Learning," MIT Press, 2016, http://www.deeplearningbook.org, 66 pages.

Henkel et al., "Alternative Half-Sample Interpolation Filters for Versatile Video Coding," IEEE International Conference on Acoustics, Speech and Signal Processing, ICASSP 2020, Proceedings, May 4-8, 2020, Barcelona, Spain, 2020, pp. 2053-2057.

Jeon et al., "Description of video coding technology proposal by LG Electronics," Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A110, 37 pages.

Jiang, "Image compression with neural networks—A survey," Signal Processing: Image Communication, 1999, vol. 14, pp. 737-760.

Karczewicz et al., "Switched Interpolation Filter with Offset," Document VCEG-AI35, ITU—Telecommunications Standardization Sector Study Group 16, Question 6, Video Coding Experts Group (VCEG), 35th Meeting: Berlin, Germany, Jul. 16-18, 2008, pp. 1-2.

Lecun et al., "Deep learning," Nature, vol. 521(7553), May 28, 2015, pp. 436-444.

Liu et al. "One-for-All: Grouped Variation Network-Based Fractional Interpolation in Video Coding," IEEE Transactions on Image Processing, May 2019, vol. 28(5), pp. 2140-2151.

Murn et al., "Interpreting CNN for Low Complexity Learned Sub-Pixel Motion Compensation in Video Coding," Arxiv.org, ArXiv:2006.06392V1, Cornell University Library, Cornell University, Ithaca, NY, Jun. 11, 2020, 5 pages.

Sullivan, "Color format downconversion for test sequence generation," Document: JVT-I018, Joint Video Team (JVT) of ISO/IEC MPEG & ITU-T VCEG (ISO/IEC JTC1/SC29/WG11 and ITU-T SG16 Q.6) 9th Meeting: Sep. 2-5, 2003, San Diego, pp. 1-10.

Sullivan et al., "Overview of the High Efficiency Video Coding (HEVC) Standard," IEEE Transactions on Circuits and Systems for Video Technology, Dec. 2012, vol. 22(12), pp. 1649-1668.

Wang et al., "Neural Network Based Inter Prediction for HEVC," 2018 IEEE International Conference on Multimedia and Expo (ICME), Institute of Electrical and Electronics Engineers (IEEE), San Diego, CA, US, 2018, pp. 1-6.

Wittmann et al., "Separable Adaptive Interpolation Filter for Video Coding,"15th IEEE International Conference on Image Processing (ICIP), Oct. 2008, pp. 2500-2503.

Yan et al., "A Convolutional Neural Network Approach for Half-Pel Interpolation in Video Coding," 2017 IEEE International Symposium on Circuits and Systems (ISCAS), Baltimore, MD, US, 2017, pp. 1-4.

Yan et al., "Convolutional Neural Network-Based Invertible Half-Pixel Inerpolation Filter for Video Coding," 2018 25th IEEE International Conference on Image Processing (ICIP), IEEE, Oct. 7, 2018, pp. 201-205.

Yan et al., "Convolutional Neural Network-Based Fractional-Pixel Motion Compensation," IEEE Transactions on Circuits and Systems for Video Technology, Institute of Electrical and Electronics Engineers, US, Mar. 1, 2019, vol. 29(3), pp. 840-853.

Ye et al., "Enhanced Adaptive Interpolation Filters for Video Coding," Data Compression Conference (DCC), Mar. 2010, pp. 435-444.

Zhang et al., "Learning a Convolutional Neural Network for Fractional Interpolation in HEVC Inter Coding," 2017 IEEE Visual Communications and Image Processing (VCIP) Conference, St. Petersburg, FL, US, Dec. 10-13, 2017, pp. 1-4.

Search Report and Search Opinion issued in related application EP 20306318.5, dated May 10, 2021, 12 pages.

* cited by examiner

METHOD FOR IMAGE PROCESSING AND APPARATUS FOR IMPLEMENTING THE SAME

CROSS-REFERENCE TO RELATED APPLICATIONS

This application claims priority benefit under 35 U.S.C. § 119(d) from European Patent Application No. EP 20306318.5, filed Nov. 3, 2020, the disclosure of which is incorporated by reference herein in its entirety.

FIELD

The present disclosure relates to the field of image processing, in particular for video stream compression/decompression.

BACKGROUND

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

In known video coding or compression schemes, images (also referred to as "frames") of an input video stream to be encoded are typically processed according to an image encoding sequence, and each image is divided into pixel sets (also referred to as, depending on the scheme, "blocks" or "coding unit") which are also processed sequentially, for example starting from the set located in the upper left corner of the image, and ending with the set located in the lower right corner of the image.

The encoding of an image of an input video stream may therefore involve dividing a pixel matrix corresponding to the image into several pixel sets, for example into blocks of a fixed size (16×16 pixels, 32×32 pixels, or 64×64 pixels), and encoding these pixel blocks according to a predefined encoding sequence. In some standards, such as H.264/AVC, blocks smaller than 16×16 pixels may be defined (for example of size 8×8 pixels or 4×4 pixels) so as to perform encoding of the image with a finer granularity.

Conventional video compression schemes can be classified into two main categories: an intra prediction video coding category on the one hand, and an inter prediction video coding category on the other hand. In intra prediction video coding, the compression processing uses pixels of a unique image or video frame, while in inter prediction video coding, the compression processing uses pixels of several images or video frames for which prediction encoding has already been performed. More specifically, in intra prediction video coding, the processing of a pixel block (or set of pixels) typically includes a prediction of the pixels of the block based on previously encoded pixels (also called "causal pixels") in the image currently being encoded (which may be referred to as "current image" or "original image"). In inter prediction video coding, the processing of a pixel block typically includes a prediction of the pixels of the block based on pixels of one or more previously encoded images.

Exploiting the spatial redundancies (for intra prediction video coding) and/or temporal redundancies (for inter prediction video coding) is therefore performed to avoid transmitting or storing the pixel values of each pixel block (or set of pixels), and at least some of the blocks of each encoded image in a video stream is represented by a pixel residual that corresponds to the difference (or the distance) between prediction values and true values for the pixels of the predicted block. Information related to pixel residual is inserted in the encoded data generated by a video encoder after transform and quantization (e.g. Discrete Cosinus Transform, DCT) so as to reduce the entropy of data generated by the encoder.

In 2013, the video compression standard High Efficiency Video Coding (HEVC)/H.265 reached FIDS status. This standard was developed by the Joint Collaborative Team on Video Coding (JCT-VC), a collaboration between two standardization bodies ISO/IEC MPEG and ITU-T VCEG. HEVC is the successor of the H.264/AVC (Advance Video Coding) standard, which is widely used nowadays (around 90% videos are still coded with AVC). HEVC brings improvements compared to AVC, offering double the data compression ratio at the same level of video quality, or substantially improved video quality at the same bit rate.

The visualization of video content has been revolutionized in the last few years with the emergence of video-on-demand services like YouTube, Netflix, Hulu, etc. web-TV, video-sharing sites, social networks like Facebook, Instagram, Snapchat etc., or live video streaming service for individuals. All of the above-mentioned services are rapidly increasing of internet video traffic. In addition, video data is getting larger and there is a constant need to compress it, but without significantly degrading the quality of the video. Research predicts that by the year 2021, the video traffic will increase by 4 times since 2016 and the amount of data will probably represent around 81% of all internet traffic. New technologies like 360° videos, Virtual Reality, HD videos, UHD videos, 4K, 8K or 16K videos yield significantly more data to transmit.

As a result, a Joint Video Experts Team (JVET)—a collaborative team formed by the same standardization bodies MPEG and VCEG—has been created with an aim to develop a new video coding standard to be known as Versatile Video Coding—VVC/H.266. The primary objective of this new codec is to provide a significant improvement in compression performance over HEVC. The VVC standard is scheduled to be released in 2021 and by then, the aim is not just to lower the bitrate at the same video quality, but also to develop a codec which would aid the deployment of higher quality video services and emerging applications such as 360° omnidirectional immersive multimedia and High Dynamic Range (HDR) video.

Motion compensated prediction (MCP) is a technique used by video coders to reduce the amount of information transmitted to a decoder by exploiting the temporal redundancy present in the video signal. By utilizing fractional accuracy for motion vectors instead of integer accuracy, the residual compression error is decreased and coding efficiency is increased. The use of motion vectors having fractional values requires the interpolation of integer pixel values in reference frames. For this reason, interpolation filters have been used in recent video coding standards, such as H.264/AVC, H.265/HEVC or MPEG-2.

The main role of the interpolation filter is to help predict the accurate values of pixels, if the motion does not correspond to exactly integer-pel precision. Since the H.264/AVC standard, the quarter-pel precision has been used for motion vectors, which has significantly improved the accuracy of the motion compensated prediction.

The interpolation filter in the HEVC standard is a DCT-based interpolation filter (DCT-IF). The VVC standard, in its current standardization stage, merely inherits the DCT-IF interpolation filter from HEVC. Older codecs also use only one type of interpolation filter for all blocks of an encoded image.

There is therefore a need for providing an improved video processing scheme and video encoder and/or decoder implementing the same that address at least some of the above-described drawbacks and shortcomings of the conventional technology in the art.

It is an object of the present subject disclosure to provide an improved video processing scheme and apparatus implementing the same.

Another object of the present subject disclosure is to provide an improved video encoding or compression and/or video decoding or decompression scheme and apparatuses implementing the same.

Another object of the present subject disclosure is to provide an improved video encoding and/or decoding scheme and apparatuses implementing the same for alleviating the above-described drawbacks and shortcomings of conventional prediction-based video encoding/decoding schemes, in particular video encoding/decoding schemes using interpolation to improve motion compensation prediction.

SUMMARY

To achieve these objects and other advantages and in accordance with the purpose of the present subject disclosure, as embodied and broadly described herein, in one aspect of the present subject disclosure, a method of processing a first image in a plurality of images, for example of input video data, wherein the first image is divided into a plurality of pixel blocks, is proposed, which comprises, for a current block of the first image: selecting, in a set of a plurality of predefined interpolation filters, a first interpolation filter based on a first prediction of an interpolation filter determined by a supervised learning algorithm to which data related to the current block is input; and using the selected first interpolation filter for calculating fractional pixel values in a second image of the plurality of images for a temporal prediction of pixels of the current block based on a reference block correlated to the current block in the second image, wherein the second image is distinct from the first image and was previously encoded according to an image encoding sequence for encoding the images of the plurality of images.

The present subject disclosure introduces the concept of smart adaptive interpolation filters (SAIF).

The proposed SAIF scheme advantageously provides an improved interpolation to be used for example for inter prediction coding of video data by selecting at the block-level granularity one or more interpolation filters that are well-suited for processing the current block, while avoiding use of encoder-decoder signaling related to the interpolation filter(s) used for processing the block through the use, at the encoder side and the decoder side, of a supervised learning algorithm for generating a prediction of the interpolation filter(s) to be used for processing the block, based on input data related to the block.

This grants an improved flexibility to the interpolation process, thanks to the ability to select among several available interpolation filters one or more optimum filters for processing the block, yet without any need for additional overhead signaling, so that the processing gain obtained through this improved flexibility is not lost, even in part, as a consequence of additional signaling overhead.

Such improvements in the interpolation result in an improved inter prediction for encoding the current block, which provides an overall encoding gain/compression gain of the video data.

According to the present subject disclosure, the interpolation used for calculating fractional pixel values for inter prediction coding of video data may be adapted dynamically based on a selection of an interpolation filter in a set of predefined interpolation filters in some embodiments. In some embodiments, interpolation filter parameters (such as, for example, interpolation filter taps) may be pre-calculated, and stored in memory, for example as a Look-Up Table containing data related to interpolation filters.

In one or more embodiments, the proposed method may further comprise: selecting, based on a first characteristic of the current block, a subset of interpolation filters in a set of predefined interpolation filters, wherein the subset of interpolation filters is input to the supervised learning algorithm for determining the first prediction of the interpolation filter, wherein the first characteristic is obtainable based on the data related to the current block input to the supervised learning algorithm.

Using subsets of interpolation filters advantageously allows providing further guidance to the supervised learning algorithm for generating a predicted interpolation filter in the subset instead of the larger set of predefined interpolation filters. The subset may be selected based on one or more characteristics of the current block, such as for example the size of the current block and/or the shape of the current block. The characteristic(s) may be obtainable based on the data related to the current block input to the supervised learning algorithm. For example, depending on the embodiment, such characteristic(s) may be comprised in the data related to the current block which is input to the supervised learning algorithm, or may be derivable from the data related to the current block which is input to the supervised learning algorithm. The supervised learning algorithm may be configured with respective correspondences between predefined values of the characteristic(s) and corresponding subsets from which the predicted interpolation filter should be selected, based on values of the characteristics obtained through data related to the current block input to the supervised learning algorithm.

In one or more embodiments, the proposed method may further comprise: selecting, based on a second characteristic of the current block, the supervised learning algorithm.

The proposed method may in such embodiments advantageously provide the ability to use a supervised algorithm that has been determined to be well-suited, for example based on measured performances, for processing the current block, based on one or more characteristics of the current block, such as for example the size of the current block and/or the shape of the current block.

In embodiments wherein characteristics of current blocks may be used for improving the proposed method, as applied in the context of video compression, such characteristics may preferably be chosen as characteristics that are available both at the encoder side during the encoding and at the decoder side during the decoding side, such as for example the size of the current block and/or the shape of the current block. Any suitable characteristic may be used for this purpose according to the present subject disclosure.

In one or more embodiments, the data related to the current block that are input to the supervised learning algorithm may comprise pixels of an application area comprising a set of at least one pixel in at least one pixel block of the first image, wherein the at least one pixel block has already been processed according to a processing sequence defined for the first image.

In one or more embodiments, the data related to the current block that are input to the supervised learning algorithm may comprise pixels from a motion compensated block in the second image.

In one or more embodiments, the determining of the first prediction of interpolation filter may be based on an identifier in the set of predefined interpolation filters output by the supervised learning algorithm. In such embodiments, the supervised learning algorithm may advantageously be configured to output as a predicted interpolation filter an index identifying one of the filters of the set of predefined filters or, depending on the embodiment, of a selected subset of the set of predefined filters.

In one or more embodiments, the supervised learning algorithm may be a gradient-based learning algorithm.

In one or more embodiments, the set of predefined interpolation filters may comprise a plurality of low-pass filters with respective cut-off frequencies. Such respective cut-off frequencies may advantageously correspond to filters with various blurriness. In some embodiments, the set of predefined interpolation filters may also comprise a DCT-IF interpolation filter, such as, for example, as specified by a video coding standard, such as VVC.

In one or more embodiments, the proposed method may further comprise: selecting, in the set of the plurality of predefined interpolation filters, a second interpolation filter based on a second prediction of an interpolation filter determined by the supervised learning algorithm to which data related to the current block is input; using the selected second interpolation filter for calculating fractional pixel values in a third image of the plurality of images in a second direction for a temporal prediction of pixels of the current block in the second direction based on a reference block correlated to the current block in the third image, wherein the third image is distinct from the first image and was previously encoded according to the image encoding sequence, wherein the selected first interpolation filter is used for calculating the fractional pixel values in the second image in a first direction for a temporal prediction of pixels of the current block in the first direction, and wherein the first direction is distinct from the second direction.

Advantageously, the first direction may be chosen to be the vertical direction, and the second direction may be chosen to be the horizontal direction, which may lead to a proposed scheme according to which the interpolation process in the vertical direction may use an interpolation filter which is different from the interpolation filter which is used for the interpolation process in the horizontal direction.

In one or more embodiments, the supervised learning algorithm may be a convolutional neural network learning algorithm.

In one or more embodiments, the proposed method may further comprise a learning phase of a neural network performed on a second set of images, the learning phase comprising, for a current block of a current image of the second set of images: selecting, in the set of predefined interpolation filters, an interpolation filter based on a distortion criterion calculated for the current block; and performing training of the neural network based on data related to the current block and the selected interpolation filter.

In another aspect of the present subject disclosure, an apparatus is proposed, which comprises a processor, and a memory operatively coupled to the processor, wherein the apparatus is configured to perform a method as proposed in the present subject disclosure.

In one or more embodiments, the proposed apparatus may be comprised and used in an image encoder, such as a video encoder.

In one or more embodiments, the proposed apparatus may be comprised and used in an image decoder, such as a video decoder.

In one or more embodiments, proposed apparatuses may be implemented in a video compression system, and a proposed apparatus may be used in an image encoder, such as a video encoder and a proposed apparatus may be used in an image decoder, such as a video decoder.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

It should be appreciated that the disclosed embodiments can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION

Figure 1A:
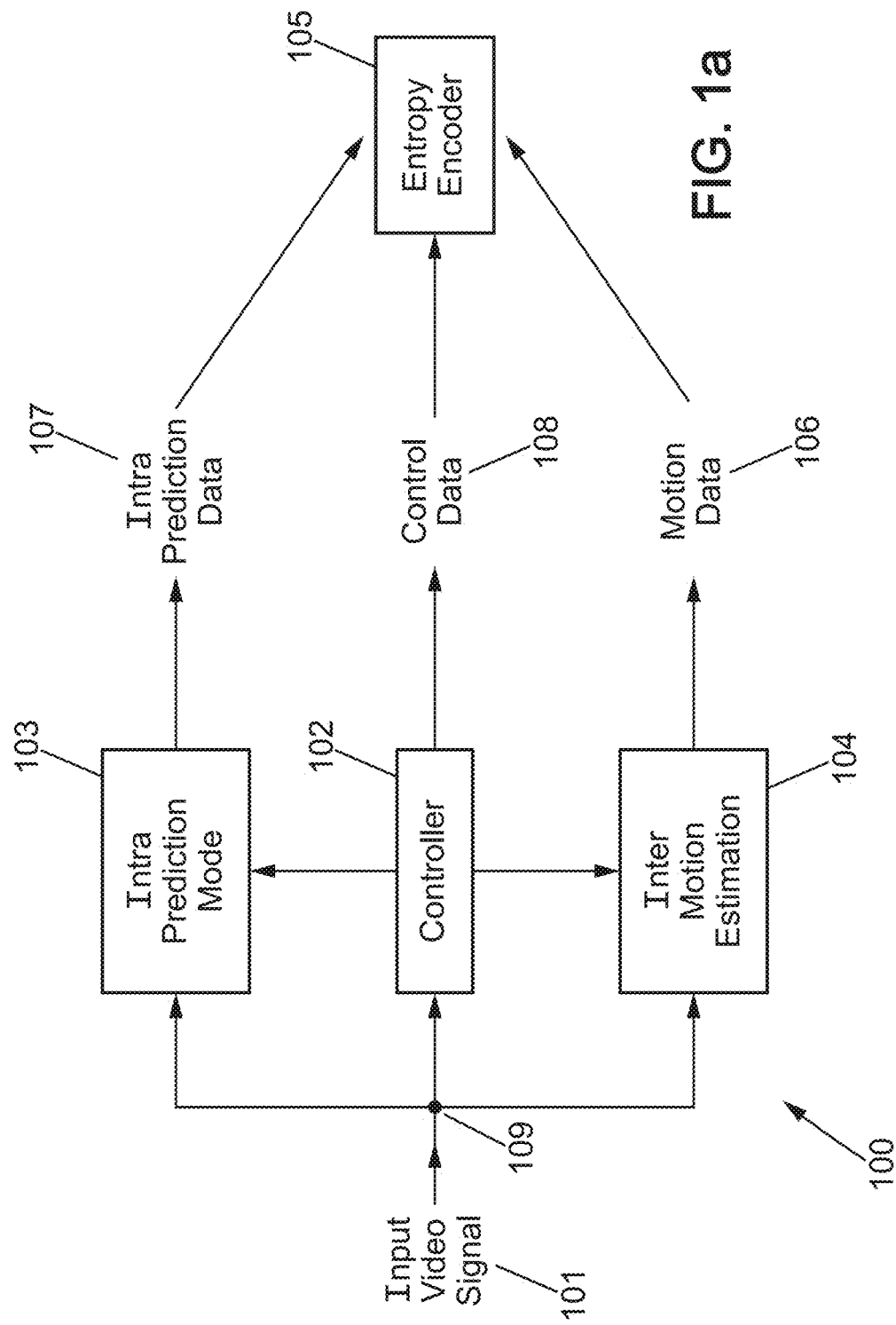
FIG. 1(a) is a block diagram illustrating an exemplary video encoder on which the proposed method may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the disclosure. Additionally, elements in the drawing figures are not necessarily drawn to scale. For example, the dimensions of some of the elements in the figures may be exaggerated relative to other elements to help improve understanding of embodiments of the present disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present subject disclosure to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present subject disclosure refer to couplings, connections and mountings that may be direct or indirect, and comprise in particular connections between electronic equipment or between portions of such equipment that allow operations and modes of operation as described in the present subject disclosure. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

In the present subject disclosure, the terms "terminal", "user equipment", "reader", "reading device", "reading terminal" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

As used herein, the term "pixel" means a picture element or an elementary component of an image, a color component image, or a (luma or chroma) channel type image, and data corresponding thereto, which may be represented by a numeric value, e.g. a natural integer value. A pixel of a digital image may be coded digitally, and its value may be coded into a bitstream. Further, a pixel of an image may represent image data according to color spaces, such as the Y, Cb and Cr color spaces, wherein Y is a luma component of the pixel (also called in the present subject disclosure a luma pixel, a luma sample, or for the sake of simplicity a pixel), and Cb and Cr are the blue-difference and red-difference chroma components of the pixel (also called in the present subject disclosure a chroma pixel, a chroma sample, or for the sake of simplicity a pixel). Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "pixel" may be used to refer, depending on the embodiment and on the image to which it pertains (which may be a YCbCr image, a component image, a chroma component image, a luma component image, etc.), to a pixel of an original image, a luma channel pixel, a chroma channel pixel, a Cb pixel, a Cr pixel, a chroma component pixel, a luma component pixel, a chroma sample, a luma sample, etc.

In the following, the term "plane" may be used to refer to, depending on the embodiment, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

The methods proposed according to the present subject disclosure may be implemented by any video encoder, video decoder, or video codec configured for encoding and/or decoding images (or frames) of input video data using predictive coding exploiting temporal redundancies of pixel blocks in images of the input video data (e.g. inter prediction video coding), such as, for example a video encoder and/or decoder compliant with any of the H.261, MPEG-1 Part 2, H.262, MPEG-2 Part 2, Alliance for Open Media (AOM) AV1, H.264/AVC, H.265/HEVC, MPEG-4 Part 2, SHVC (Scalable HEVC), H.266/VVC, and MPEG-5 EVC specifications or standards, whether in their existing versions and/or their evolutions, as the case may be adapted for implementing one or more embodiments of the proposed methods.

Shown on FIG. 1(a) is a video encoder 100 that is configured to receive at input 109 an input video stream 101 that includes a plurality of images (or frames) to be processed for the encoding of the input video stream. The video encoder includes a controller 102, operatively coupled with the input interface 109, configured for controlling the operations of a motion estimation unit 110 and an inter prediction encoding unit 104, as well as an intra prediction encoding unit 103. Data received on the input interface 109 are transmitted to the motion estimation unit 110, to the inter prediction encoding unit 104, to the intra prediction encoding unit 103, and to the controller 102. Together with the controller 102, the motion estimation unit 110, the inter prediction encoding unit 104, and the intra prediction encoding unit 103 form an encoding unit 111 which is operatively coupled to the input interface 109.

The intra prediction encoding unit 103 is configured to generate intra prediction data 107 which are inputted to an entropy encoder 105. The motion estimation unit 110 is configured to generate motion data 106, which typically includes motion estimation data, which are provided to the controller 102 as well as to the inter prediction encoding unit 104 for inter prediction encoding. The inter prediction encoding unit 104 is configured to generate inter prediction data which are inputted to the entropy encoder 105. For example, in some embodiments, data provided to the decoder for an inter prediction encoding may include pixel residuals and information related to one or more motion vectors. Such information related to one or more motion vectors may include one or more indices that each identifies a prediction vector in a list of prediction vectors known to the decoder. Data provided to the decoder for a skip prediction mode may typically not include any pixel residual, and may also include one or more indices that each identifies a prediction vector in a list of prediction vectors known to the decoder. The list of prediction vector used for inter prediction encoding may not be identical to the list of prediction vectors used for skip prediction encoding.

The controller 102 is configured to generate control data which may also be provided as input data to the entropy encoder 105.

In one or more embodiments, an image undergoing processing is typically divided into blocks or coding units, the form and size of which may be determined based on the size of the pixel matrix that corresponds to the image, for example into square-shaped macroblocks of size 16×16 pixels. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

One may therefore consider a so-called "current block," that is, a block being under processing in the current image. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction type may be used, such as an intra prediction, an inter prediction, and/or a skip prediction, implemented in the encoder, the predicting of the block pixels typically include a selection of a prediction type, and the generating of prediction data that correspond to the selected prediction type, which may form, together with prediction type selection data, a set of encoding parameters.

In some embodiments, the prediction of the block under processing may comprise a calculation of pixel residuals, which respectively correspond to a gap, or distance, or difference, between pixels of the current block and corresponding pixels of a prediction block. The pixel residuals may be transmitted to the decoder in some embodiments after transform and quantization.

Different encoding modes may therefore be available for the encoding of a current block, so that encoding information 106-108 may be included in the data generated by the encoder further to the encoding of the current block. Such encoding information may for example comprise information on a coding mode (e.g. information indicating the type of prediction, among intra, inter, and skip, or among intra and inter) used for encoding the current block, information on the partitioning of the current block into sub-blocks, as the case may be, motion estimation information in the case of a prediction of the inter or skip type, and/or intra prediction mode information 107 in the case of a prediction of the intra type.

Interpolation for inter prediction video coding is described hereinafter in order to assist the understanding of the proposed method according to the present subject disclosure.

The coding of a current block of a first image in a set of images of input video data using motion compensated prediction typically involves determining a block (sometimes referred to as a "prediction block" or as a "reference block") in a second image of the set of images which has already been encoded (sometimes referred to as "reference image" or "reference frame"), which is correlated with the current block. Once a prediction block has been determined in the reference image, a motion vector representing the motion of the block between the first image and the reference image is determined, so that encoding information for the current block may comprise only information on the motion vector.

The pixel values of each block may correspond, depending on the block, to luma sample values, or to chroma sample values, which may be viewed as integer positions. For example, the H.264/MPEG-4 AVC video coding standard uses so-called "macroblocks", each macroblock comprising a 16×16 block of luma samples, and two corresponding 8×8 blocks of chroma samples for 4:2:0 color sampling.

In the following, aspects of the H.265/HEVC video coding standard useful for the understanding of the present subject disclosure are described.

Sampled representation of pictures: For representing color video signals, HEVC typically uses a tri-stimulus YCbCr color space with 4:2:0 sampling. This separates a color representation into three components called Y so-called luma component and Cb, and Cr called-chroma components. Each sample (also referred to as a pixel) for each component is typically represented with 8 or 10 bits of precision, and the 8-bit case is the more typical one. The video pictures are typically progressively sampled with rectangular picture sizes W×H, where W is the width and H is the height of the picture in terms of luma samples. Each chroma component array, with 4:2:0 sampling, is then W/2×H/2. Other color spaces are supported by HEVC such as, for example, color spaces with 4:2:2 sampling.

Division of the picture into Coding Tree Units: A picture is partitioned into CTUs (Coding Tree Units), each containing luma CTBs (Coding Tree Block) and chroma CTBs. A luma CTB covers a rectangular picture area of L×L samples of the luma component and the corresponding chroma CTBs cover each L/2×L/2 samples of each of the two chroma components with 4:2:0 sampling. The value of L may be equal to 16, 32, or 64 as determined by an encoded syntax element specified in the Sequence Parameter Set (SPS). HEVC supports variable-size CTBs selected according to the needs of encoders in terms of memory and computational requirements. The luma CTB and the two chroma CTBs together with the associated syntax form a CTU.

Division of the Coding Tree Block into Coding Blocks: The blocks specified as luma and chroma CTBs can be directly used as coding blocks (CBs) or can be further partitioned into multiple CBs. The partitioning is achieved using tree structures. The CTU contains a quadtree syntax that allows for splitting the CBs to a selected appropriate size based on the signal characteristics of the region that is covered by the CTB.

Figure 1B:
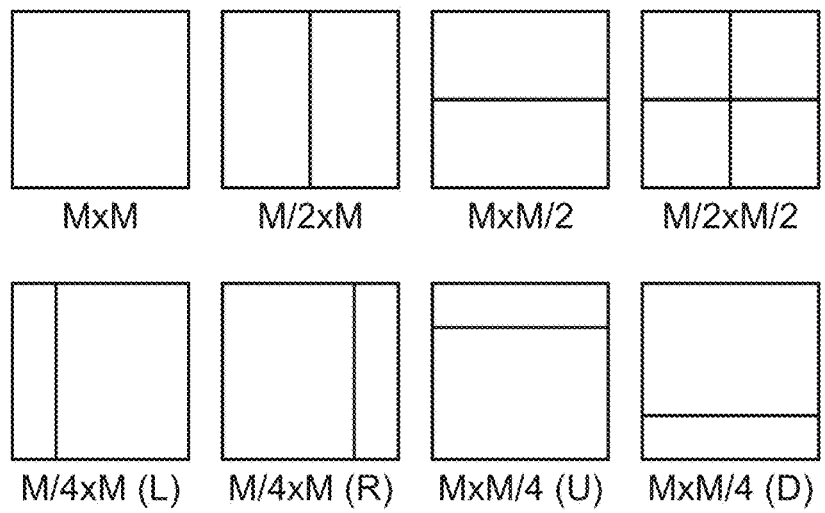
FIG. 1(b) illustrates different coding block splitting modes supported by the HEVC standard, which may be used in accordance with one or more embodiments.

Prediction Blocks and Units: The prediction mode for the CU (Coding Unit) is signaled as being intra or inter, according to whether it uses intra-picture (spatial) prediction or inter-picture (temporal) prediction. When the prediction mode is signaled as intra, the block size at which the intra prediction mode is established is the same as the CB size for all block sizes except for the smallest CB size that is allowed in the bitstream. When the prediction mode is signaled as inter, it is specified whether the luma and chroma CBs are split into one, two, or four PBs (Prediction Blocks), as shown in FIG. 1(b). FIG. 1(b) shows HEVC supported modes for splitting a CB into PBs in case of inter prediction. In the case of intra prediction, only M×M and M/2×M/2 (when M/2=4) are supported.

Figure 1C:
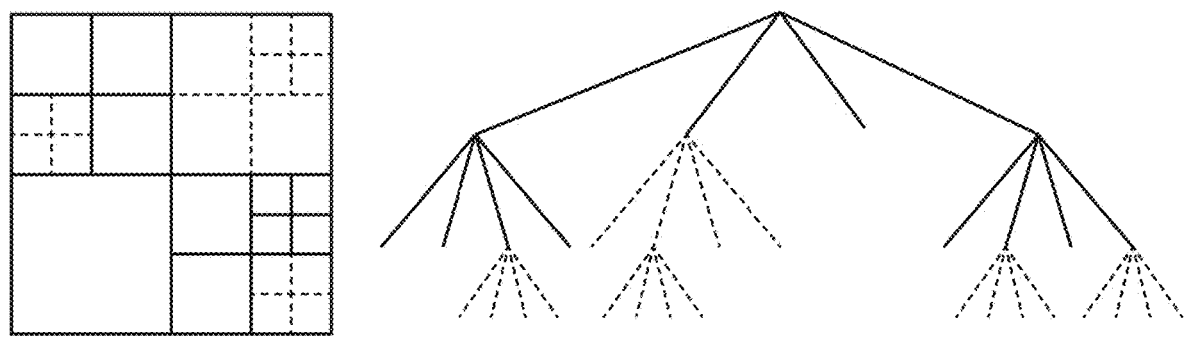
FIG. 1(c) illustrates a subdivision of an HEVC coding tree block into coding blocks and a corresponding quadtree, which may be used in accordance with one or more embodiments.

Tree-structured partitioning into Transform Blocks and Units: For residual coding, a CB can be recursively partitioned into Transform Blocks (TB). The largest possible TB size is equal to the CB size. The partitioning itself is signaled by a residual quadtree. Only square partitioning is specified, where a block can be recursively split into quadrants as illustrated in FIG. 1(c), which shows a subdivision of a CTB into CBs (and Transform Block (TBs). Solid lines indicate CB boundaries and dotted lines indicate TB boundaries. Shown on the left of FIG. 1(c) is a CTB with its partitioning, and on the right the corresponding quadtree. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants.

Intra-picture prediction: During the intra prediction process, current PUs are predicted using previously decoded boundary samples from adjacent PUs. 33 different angular directions are defined and supported for the PUs to cover more angles. Two other modes are implemented and can be used for the intra prediction: the Planar mode, assuming an amplitude surface with a horizontal and a vertical slope derived from the boundaries, and the DC mode for flat surfaces with a value matching the mean value of boundary.

Inter-picture prediction: Inter-coded blocks have more partition shapes than intra-coded ones as shown in FIG. 1(b). Asymmetric motion partitions are also supported in HEVC, as a CB can be split into two unequal-size blocks. HEVC supports motion vectors with units of one quarter of the distance between luma samples. For chroma samples, it is determined by the chroma sampling format. In the case of a 4:2:0 sampling format, the distance between chroma samples is in units of ⅛. Fractional sample interpolations are used to generate prediction samples for non-integer sampling positions. The fractional sample interpolation uses separable application of an 8-tap filter for the half sample positions and 7-tap filter for the quarter-sample positions. In HEVC, no intermediate rounding operations are computed, and longer filters have been adopted to improve precision and simplify the architecture of the process.

Transform, scaling, quantization and entropy coding: HEVC implements transforms for residual transform blocks in the same fashion than previous standards. The residual blocks obtained after the prediction are partitioned into multiple square TBs, possible block sizes are 4×4, 8×8, 16×16 and 32×32 squared pixels. The core transformation consists in applying two one-dimensional transforms in both horizontal and vertical directions. The elements of the core transform matrices have been derived by approximating scaled Discrete Cosine Transform (DCT) basis functions. An alternative integer transform is used to 4×4 luma residual blocks for intra prediction modes and it is derived from the Discrete Sine Transform (DST).

For quantization, the same uniform-reconstruction quantization scheme controlled by a quantization parameter as in H.264/AVC is used in HEVC. The range of QP values is defined from 0 to 51, and the quantization step sizes is increased by 6 doubles. In H.264/AVC, two arithmetic coding algorithms were available and could be used, HEVC specifies only one arithmetic coding method which is the Context Adaptive Binary Arithmetic Coding (CABAC), the main algorithm remains unchanged.

Figure 2A:
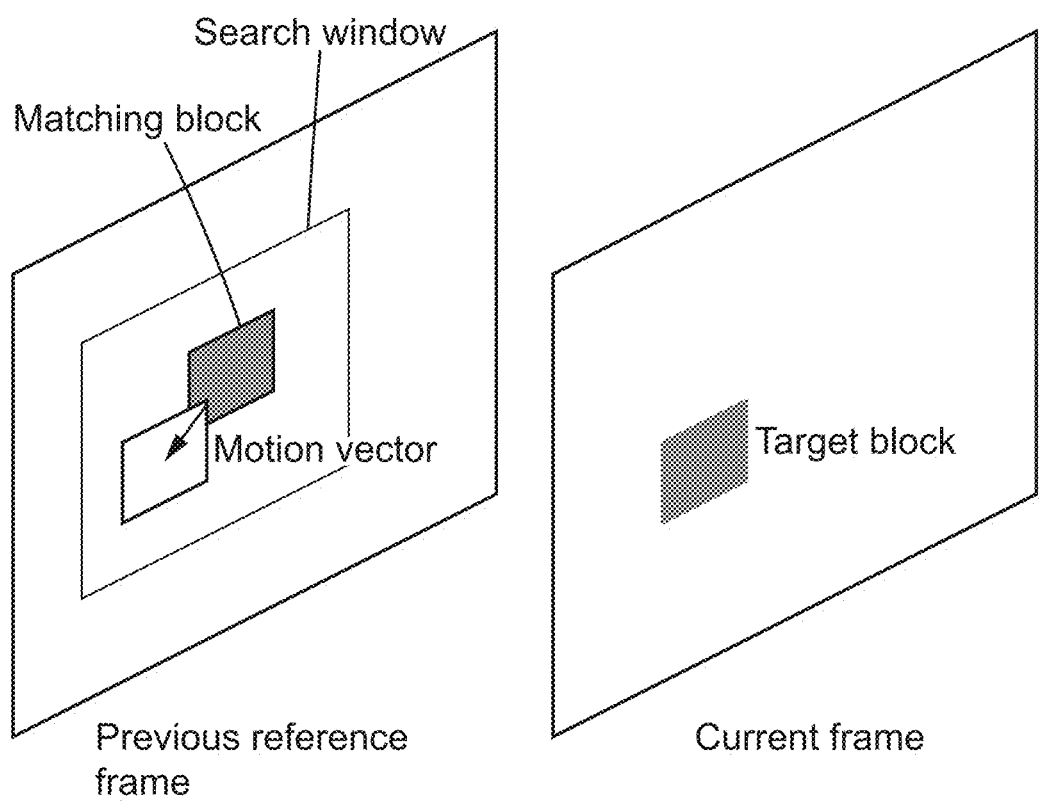
FIG. 2(a) illustrates motion compensation, which may be used in accordance with one or more embodiments.

Motion compensated prediction (MCP) is a technique used by video coders to reduce the amount of information transmitted to a decoder by exploiting the temporal redundancy present in the video signal. In MCP, the picture to be coded is first divided into blocks, and for each block, an encoder searches reference pictures that have already been encoded to find a best matching block as shown in FIG. 2(a). The best matching block is called the prediction of the corresponding block and the difference between the original and the prediction signal is coded by various means, such as transform coding, and transmitted to a decoder. The relative position of the prediction with respect to the original block is called a motion vector and is transmitted to the decoder along with the residual signal.

Figure 2B:
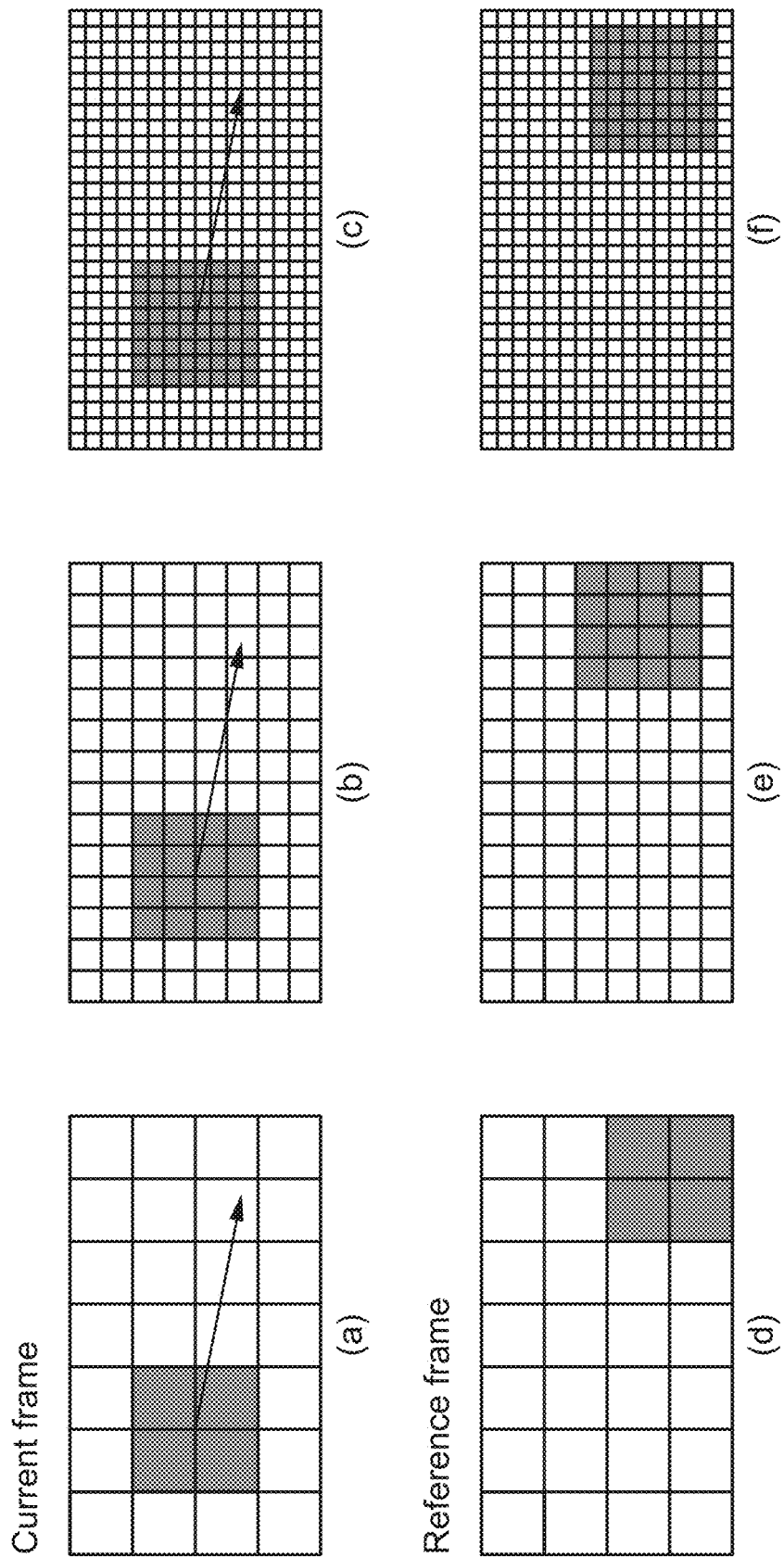
FIG. 2(b) illustrates using different pel precisions to improve the accuracy of motion compensated prediction, which may be used in accordance with one or more embodiments.

The true displacements of moving objects between pictures are continuous and do not follow the sampling grid of the digitized video sequence. This is illustrated in FIG. 2(b), which shows a current frame and a reference frame. The current frame is illustrated on the upper part of the figure with three pel precisions: integer-pel (FIG. 2(b)(a)), half-pel (2-pel) (FIG. 2(b)(b)), and quarter-pel (4-pel) (FIG. 2(b)(c)) precisions. The reference frame is illustrated on the lower part of the figure, also with three pel precisions: integer-pel (FIG. 2(b)(d)), half-pel (2-pel) (FIG. 2(b)(e)), and quarter-pel (4-pel) (FIG. 2(b)(f)) precisions. A motion vector points from a current 2×2 pixel blocks in the current frame to a position of a correlated prediction block in the reference frame. FIG. 2(b) shows that, for a given current block and motion vector, the prediction block pixels are determined with a better accuracy when using a 2-pel precision than when using integer precision, as well as when using a 4-pel precision than when using a 2-pel precision.

The precision of a motion vector can be represented in different accuracies. The 4-pel precision has been introduced in H.264/AVC and it is also used in HEVC. The 4-pel precision refers to using a quarter of the distance between pixels (or luma sample positions) as the motion vector precision for motion estimation and MCP. Hence, by utilizing fractional accuracy for motion vectors instead of integer accuracy, the residual error is decreased and coding efficiency of video coders is increased. If a motion vector has a fractional value, the reference block may be interpolated accordingly.

The samples of the PB for an inter-coded CB are obtained from those of a corresponding block region in the reference picture, which is at a position displaced by the horizontal and vertical components of the motion vector. Fractional sample interpolation may be used to generate the prediction for non-integer sampling positions. Interpolation filters are used to help predict the accurate values of pixels. Though higher precision motion vectors take more bits to encode, they can sometimes result in more efficient compression overall, by increasing the quality of the prediction signal.

The precision of the motion estimation may be improved by using fractional pixel values (also referred to as "fractional-pel" values) to achieve fractional-pel precisions, e.g. quarter-pel precision, half-pel precision, for the motion estimation, in particular for the accuracy of the motion vector. In order to reach fractional-pel values, that is, values at fractional positions in between two integer pixel values (or luma/chroma sample positions) in a reference image, integer pixel values are interpolated using an interpolation filter. Interpolation may be used for any type of pixel values, that is, for luma sample positions and/or chroma sample positions.

The number of integer pixel values involved in the interpolation process depends on the number of taps of the interpolation filter.

Pixel prediction based on motion estimation can therefore be improved by reaching fractional-pel values pointed to by a motion vector having fractional accuracy.

The interpolation filter specified in H.264/AVC uses various combinations of separable one-dimensional filters according to the fractional sample position. The main features of the interpolation filter used in the AVC standard are: 6-taps interpolation filter for obtaining luma samples at half-pel positions, cascade averaging for obtaining luma samples at quarter-pel positions, and bilinear interpolation for chroma samples.

In HEVC there is only one interpolation filter for luma samples and one interpolation filter for chroma samples, for each fractional position. The design used is based on a simplified form of the DCT-IF (Discrete Cosine Transformation—Interpolation Filter). The main features of DCT-IF interpolation filter used in H.265/HEVC standard are: symmetric 8-taps filter for luma samples at half-pel positions, asymmetric 7-taps filter for luma samples at quarter-pel positions, 4-taps filter for chroma samples.

In all previous video coding standards, the interpolation process for inter predicted frames has been static, meaning all the coefficients are the same and are independent from the content of the frames, that is, the images of input video data.

Filter coefficients for chroma and luma samples in HEVC are shown in Table 1 and Table 2, respectively.

TABLE 1

Luma interpolation filter coefficients for DCT-IF in HEVC

| Frac | Coefficients |
|---|---|
| 0 | {0, 0, 0, 64, 0, 0, 0, 0} |
| 1 | {−1, 4, −10, 58, 18, −5, 1} |
| 2 | {−1, 4, −11, 40, 40, −11, 4, −1} |
| 3 | {1, −5, 18, 58, −10, 4, −1} |

TABLE 2

Chroma interpolation filter coefficients for DCT-IF in HEVC

| Frac | Coefficients |
|---|---|
| 0 | {0, 64, 0, 0} |
| 1 | {−2, 58, 10, −2} |
| 2 | {−4, 54, 16, −2} |
| 3 | {−6, 46, 28, −4} |
| 4 | {−4, 36, 36, −4} |
| 5 | {−4, 28, 46, −6} |
| 6 | {−2, 16, 54, −4} |
| 7 | {−2, 10, 58, −2} |

Filter coefficients for luma samples in HEVC, where just 4-pel precision existed, are shown in Table 1 in Frac=0 (integer), Frac=4 and 12 (Quarter-pel) and Frac=8 (Half-pel).

The H.266/VVC standard inherits the DCT-IF from HEVC with an extension from the quarter-pel precision to the high precision (1/16 pel precision) in VVC. Table 3 represents the new coefficients of VVC.

TABLE 3

Luma interpolation filter coefficients for DCT-IF in VVC

| Frac | DCT-IF Coefficients |
|---|---|
| 0 | {0, 0, 0, 64, 0, 0, 0, 0} |
| 1 | {0, 1, −3, 63, 4, −2, 1, 0} |
| 2 | {−1, 2, −5, 62, 8, −3, 1, 0} |
| 3 | {−1, 3, −8, 60, 13, −4, 1, 0} |
| 4 | {−1, 4, −10, 58, 17, −5, 1, 0} |
| 5 | {−1, 4, −11, 52, 26, −8, 3, −1} |
| 6 | {−1, 3, −9, 47, 31, −10, 4, −1} |
| 7 | {−1, 4, −11, 45, 34, −10, 4, −1} |
| 8 | {−1, 4, −11, 40, 40, −11, 4, −1} |
| 9 | {−1, 4, −10, 34, 45, −11, 4, −1} |
| 10 | {−1, 4, −10, 31, 47, −9, 3, −1} |
| 11 | {−1, 3, −8, 26, 52, −11, 4, −1} |
| 12 | {0, 1, −5, 17, 58, −10, 4, −1} |
| 13 | {0, 1, −4, 13, 60, −8, 3, −1} |
| 14 | {0, 1, −3, 8, 62, −5, 2, −1} |
| 15 | {0, 1, −2, 4, 63, −3, 1, 0} |

Although DCT-IF is efficient, it is not adapted to objects whose speed vary, since it cannot compensate variations in the amount of motion-related blurriness incurred by a camera capture. Furthermore, DCT-IF tries to maximize accuracy, but this may not be a wanted characteristic when interpolating in some specific cases, such as for example fast-moving objects.

The concept of adaptive interpolation filters advantageously allows using different interpolation filters for the same fractional sample position in different parts of a video sequence. However, a common drawback of conventional methods related to the adaptive interpolation filtering is that they allow switching among different interpolation filters only at a coarse granularity, i.e. at the slice level in VVC, which in VVC is a granularity coarser than the block level granularity. Furthermore, the selection may be explicitly signaled, possibly by transmitting the individual Finite Impulse Response (FIR) filter coefficients. Allowing to select an interpolation filter at a finer granularity, such as Coding Tree Unit (CTU) or Coding Unit (CU) level, may advantageously enable better adaptation to local image characteristics. The present disclosure aims at proposing a scheme for interpolation filter selection at a finer granularity, such as the block level, which may advantageously be used for the half pel precision, but also for the quarter pel precision, in order to leverage the additional benefits of using the scheme for the quarter pel precision. In addition, as mentioned above, the explicit filter signaling requirement may significantly deteriorate the additional performance gain reached by using the adaptive interpolation filters scheme. In addition, using explicit signaling may limit the number of used interpolation filters since increasing the number of interpolation filters would result in an increase of signaling cost. In this regard, the schemes proposed in the present subject disclosure advantageously avoid the need of any signaling related to an interpolation filter while using the concept of adaptive interpolation filters. In particular, avoiding the need of signaling allows increasing the number of filters that may be selected for interpolation.

Avoiding the signaling provides a further advantage as follows: In the VVC reference software, the interpolation process is performed for luma samples in both horizontal and vertical directions using 15 different 8-tap FIR filters presented in Table 3. Since in the VVC reference model, only one fixed DCT-interpolation filter is proposed, the horizontal and vertical interpolations are performed using the same filter. The present subject disclosure provides a more flexible scheme according to which different filters may be selected for the horizontal and the vertical interpolations. Experiments have shown that the proposed scheme, which allows using different interpolation filters for interpolating in the horizontal and the vertical directions, provides a significant increase in gain. Such gain increase may for example be measured for the BD-gain (according to the Bjontegaard Delta Rate formula), as experimental results showed that the BD-rate gains almost doubled for some test sets of images. Signaling the interpolation filter choice between the encoder and the decoder would mean signaling in some cases two different filters, respectively corresponding to the horizontal and vertical directions, leading to doubling the signaling cost related thereto. Avoiding the signaling according to the present subject disclosure advantageously avoids such signaling cost, while still leveraging the benefits of using different interpolation filters for the horizontal and the vertical interpolations.

Therefore according to embodiments of the present subject disclosure, different combinations of horizontal and vertical filtering may be performed, which advantageously increases the gain achievable using the proposed methods.

For example, in some embodiments, the horizontal interpolation may advantageously be performed independently from the vertical interpolation for a given block by inferring for each of the horizontal and vertical dimensions a suitable filter, thereby avoiding an increased encoder-decoder signaling with additional signaling data related to each of the interpolation filter chosen horizontal and vertical dimensions, respectively. For example, in such embodiments, instead of predicting a same filter for the horizontal and vertical interpolations, a supervised learning algorithm (e.g. a CNN) may be used to predict two interpolation filters, that is, a filter for the horizontal dimension and another for the vertical dimension.

Figure 3A:
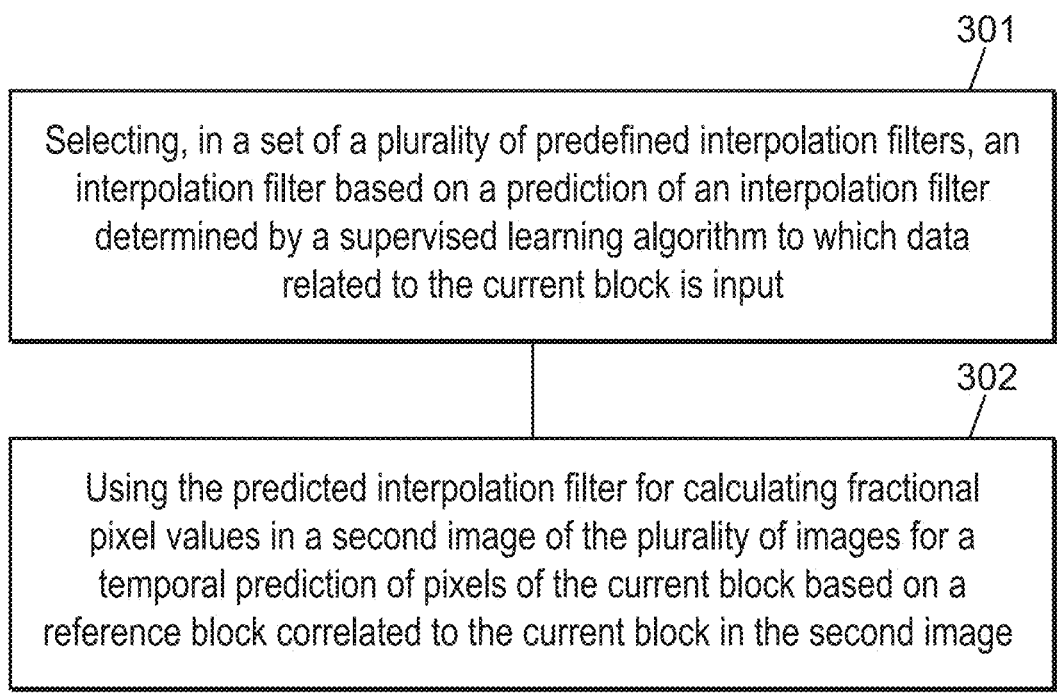
FIGS. 3(a) and 3(b) are block diagrams illustrating exemplary video processing methods in accordance with one or more embodiments.

FIG. 3a is a block schematic diagram of a method of processing a first image in a plurality of images data according to embodiments of the present subject disclosure.

In some embodiments, the first image may be divided into a plurality of pixel blocks as discussed above, which may or may not be of equal size or of same shape, for purposes of processing (e.g. encoding or decoding) the image through processing of the blocks, possibly according to a block processing (e.g. encoding or decoding) sequence. The block encoding sequence for processing, at the encoder or at the decoder, the blocks of the first image may define a sequence according to which blocks are processed one after another. Because the blocks of the first image may be encoded at the encoder according to a predetermined processing sequence, the encoded blocks may be decoded at the decoder according to the same processing sequence. For example, a raster scan sequence may scan the blocks of the image starting from the block located at the leftmost upper corner of the first image (represented by a pixel matrix), and progress to the block adjacent to the previously scanned block located to the right of such block.

The pixel blocks of the image may each be any set of pixels of the image, and may be chosen so that the set of blocks forms a partition of the image, that is, each pixel of the image belongs to only one block, and there is a one-to-one correspondence between each pixel of the image and a pixel of at least one block.

The pixel values of each block may correspond, depending on the block, to luma sample values, or to chroma sample values. For example, the H.264/MPEG-4 AVC video coding standard uses so-called "macroblocks", each macroblock comprising a 16×16 block of luma samples, and two corresponding 8×8 blocks of chroma samples for 4:2:0 color sampling.

The encoding of a current block of the first image using inter prediction encoding typically involves, as discussed above, a reference image in the plurality of images, which reference image was previously processed (e.g. encoded or decoded) according to an image processing sequence for processing (e.g. encoding or decoding) the images of the plurality of images.

In one or more embodiments, a set comprising a plurality of interpolation filters may have been predefined. Example filter designs for populating such a set of interpolation filters are provided below.

In one or more embodiments, associations of subsets of this set of interpolation filters with respective available block sizes may also be defined.

In one or more embodiments, a supervised learning algorithm is used for obtaining a prediction of an interpolation filter in the set of predefined interpolation filters, based on input data related to the current block which is input to the supervised learning algorithm. Based on the obtained prediction of interpolation filter, an interpolation filter of the set of predefined interpolation filters may be selected (301) for the current block.

Using a supervised learning algorithm for determining an interpolation filter in a set of predefined interpolation filters, for example known at both an encoder side and a decoder side, advantageously minimizes or may avoid using signaling of the interpolation filter used to encode the current block at the encoder side to the decoder side.

The selected interpolation filter (based on the prediction output by the supervised learning algorithm) may then be used (302) for calculating fractional pixel values in a second image used as a reference image as part of a temporal prediction of pixels of the current block based on the prediction block of the reference image, for example as part of a motion estimation of the current block with respect to the prediction block of the reference image. For example in some embodiments the selected interpolation filter may be used for calculating fractional pixel values in a second image of the plurality of images for a temporal prediction of pixels of the current block based on a reference block correlated to the current block in the second image, wherein the second image is distinct from the first image and was previously encoded according to an image encoding sequence for encoding the images of the plurality of images.

In one or more embodiments, the proposed scheme may be used at the block level, so that different filter coefficients may be derived for each block of an image to be processed for motion interpolation in inter-picture prediction of the block.

In one or more embodiments, different subsets of interpolation filters of the set of interpolation filters, respectively associated with one or more characteristics of the current block, such as for example the size and/or the form of the current block, may be used in order to narrow down the number of interpolation filters from which an interpolation filter is used for processing the current block.

In this regard, in one or more embodiments, the proposed scheme may further comprise the selecting, based on a characteristic of the current block, a subset of interpolation filters in a set of predefined interpolation filters. The selected subset of interpolation filters may then be included in the data input to the supervised learning algorithm used for determining the prediction of the interpolation filter. The supervised learning algorithm may then advantageously be guided through knowledge of the subset of interpolation filters from which the predicted interpolation filter may be selected.

In one or more embodiments, a supervised learning algorithm to be used for obtaining the prediction of interpolation filter may be also selected among a plurality of previously trained supervised learning algorithms, based on one or more characteristics (e.g. the size and/or the shape) of the current block, so as to advantageously use a supervised learning algorithm that is well-suited for use for processing the current block, in particular in that it provides good performances. In some embodiments, the supervised learning algorithm may then be selected, among a plurality of supervised learning algorithms, based on a characteristic of the current block.

Depending on the embodiment, the characteristic of the current block comprises one or more of a size of the current block, and a shape of the current block.

Figure 3B:
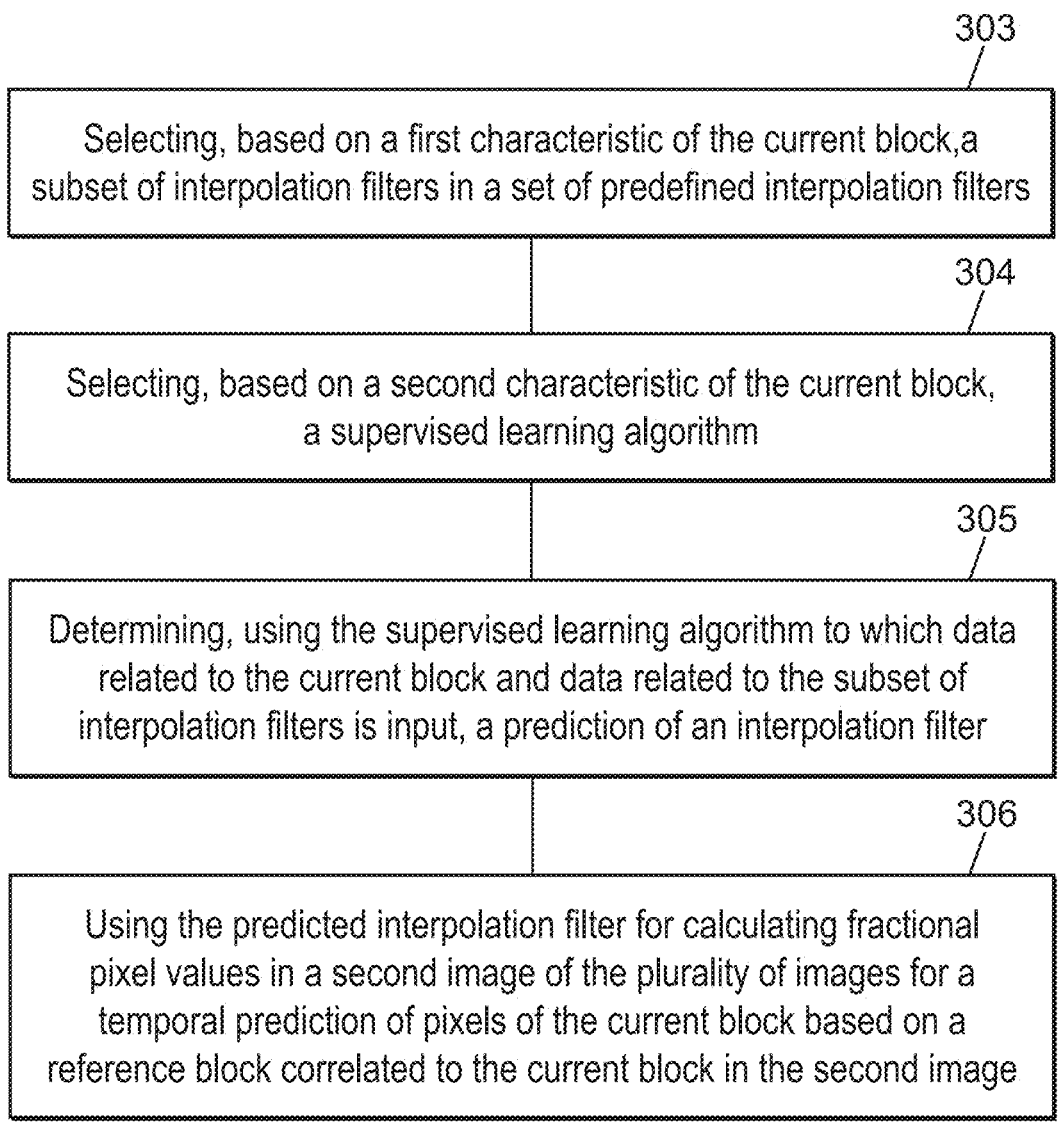

FIG. 3b is a block schematic diagram of a method of processing a first image in a plurality of images data according to embodiments of the present subject disclosure.

As described above in reference with FIG. 3a, in some embodiments, the first image may be divided into a plurality of pixel blocks as discussed above, which may or may not be of equal size or of same shape, for purposes of processing (e.g. encoding or decoding) the image through processing of the blocks, possibly according to a block processing (e.g. encoding or decoding) sequence. The block encoding sequence for processing, at the encoder or at the decoder, the blocks of the first image may define a sequence according to which blocks are processed one after another. Because the blocks of the first image may be encoded at the encoder according to a predetermined processing sequence, the encoded blocks may be decoded at the decoder according to the same processing sequence. For example, a raster scan sequence may scan the blocks of the image starting from the block located at the leftmost upper corner of the first image (represented by a pixel matrix), and progress to the block adjacent to the previously scanned block located to the right of such block.

Based on a characteristic (e.g. the size) of the current block, one of the subsets of interpolation filters may then be selected (303). Details of interpolation filter designs that are well suited for predefining such set and subsets of interpolation filters are provided hereinafter.

In one or more embodiments, a plurality of supervised learning algorithms may also be configured for producing an interpolation filter prediction, depending on their respective performance over complexity ratio. For example, a supervised learning algorithm based on a low-complexity convolutional neural network may be used for large block sizes, such as blocks of 16×16 pixels, 16×32 pixels, 32×16 pixels, and 32×32 pixels, and a higher complexity computation neural network may be used for smaller block sizes, such as blocks of 8×8 pixels.

In such embodiments, a supervised learning algorithm may also be selected (304) based on the same (e.g. the size) or a different characteristic of the current block to be processed.

The selected supervised learning algorithm may then be executed (305) in order to produce a prediction of an interpolation filter. In one or more embodiments, the selected supervised learning algorithm may run with input data which comprises data related to the current block, and data related to the selected subset of interpolation filters. The predicted interpolation filter may then be selected by the supervised learning algorithm in the subset of the interpolation filters. Further, the output of the supervised learning algorithm (comprising the predicted interpolation filter) may in some embodiments comprise an identifier of an interpolation filter in the set of predefined interpolation filters, such as, for example, an index of an interpolation filter in the selected subset of interpolation filters.

The predicted interpolation filter (output by the supervised learning algorithm) may then be used (306) for calculating fractional pixel values in the reference image as part of a temporal prediction of pixels of the current block based on the prediction block of the reference image, for example as part of a motion estimation of the current block with respect to the prediction block of the reference image.

Smart Adaptive Interpolation Filter (SAIF) as provided in the present subject disclosure advantageously gives the ability to improve the interpolation process by selecting among a plurality of interpolation filters an optimal filter according to some chosen criteria, while avoiding the overhead of signaling (e.g. to a decoder) related to the selected interpolation filter. In particular, the proposed process advantageously allows the interpolation to be different as needed, therefore it allows the inter prediction to be blurry for some cases, and sharp for others.

In one or more embodiments, a set of filters that may be selected according to the proposed process may be predefined. In some embodiments, filter designs exhibiting clear difference in their frequency responses may be used, and therefore put in competition with each other at a fine granularity being the block level. Indeed, experiments and observations have shown that interpolation filters that are blurrier than the conventional DCT-IF filter may in some cases be beneficial, for example for images captured by a capture device which blurs out objects with specific textures. As some blocks of such images will appear blurry, it may be beneficial to use an interpolation filter that is blurrier than the DCT-IF filter for these blocks. Blurrier filters as compared to DCT-IF filter will typically have a cutoff frequency smaller than that of the DCT-IF filter.

Filter designs that are well-suited for use in embodiments of the proposed subject disclosure are described below.

Even though the following focuses on non-limiting examples of specific filter designs that may be used for interpolation in image processing schemes, a person of ordinary skill in the art would understand that the proposed processes, apparatuses and computer programs of the present subject disclosure may be implemented in some embodiments with other interpolation filter designs, and that such proposed processes, apparatuses and computer programs of the present subject disclosure are not limited to the use of any specific interpolation filter design, and in particular the designs described below, which are provided as examples only.

In signal processing, a window function is a mathematical function that is zero-valued outside of some chosen interval. In typical applications, these functions are non-negative, smooth, "bell-shaped" curves. Some window functions, such as the Rectangular window, Triangular window, Parzen window, Blackman window, and Hamming window, are known in the field of signal processing.

The Kaiser window function is defined as:

$$w(x) = \begin{cases} \dfrac{I_0\left(\beta\sqrt{1-\left(\frac{x}{L}\right)^2}\right)}{I_0(\beta)} &, |x| \leq L \\ 0 &, \text{otherwise} \end{cases}$$

where $I_0(x)$ represents the modified $0^{th}$ order Bessel function of the first kind, and β is a window shape tuning parameter that adjusts the trade-off between stop-band attenuation or pass-band ripple and transition bandwidth. This function can be computed using the following approximation:

$$I_0(x) \cong 1 + \sum_{k=1}^{K}\left(\frac{(x/2)^k}{k!}\right)^2$$

Figure 4A:
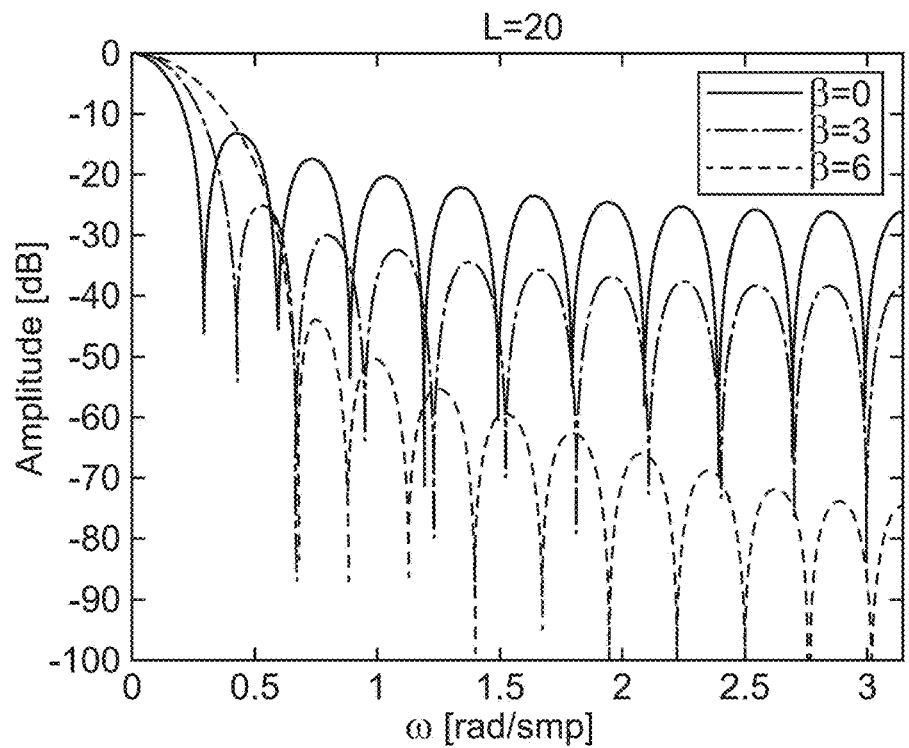
FIG. 4(a) is a plot diagram of respective impulse responses of Kaiser window functions in the time domain in accordance with one or more embodiments.

The Kaiser window may in some embodiments be preferred to other window functions, in particular because of its capability to adapt the number of lobes, the width, and the slope of the window on two coefficients:

The parameter β controls the slope of the window in the time domain, that is, it controls the trade-off between the main-lobe width and the side-lobe area in the frequency domain. As β increases, the main lobe increases in width, and the side lobes decrease in amplitude, as illustrated by FIG. 4(a), which shows the transfer function of a Kaiser window in the frequency domain for different values of β (β=0, β=3, and β=6).

Figure 4B:
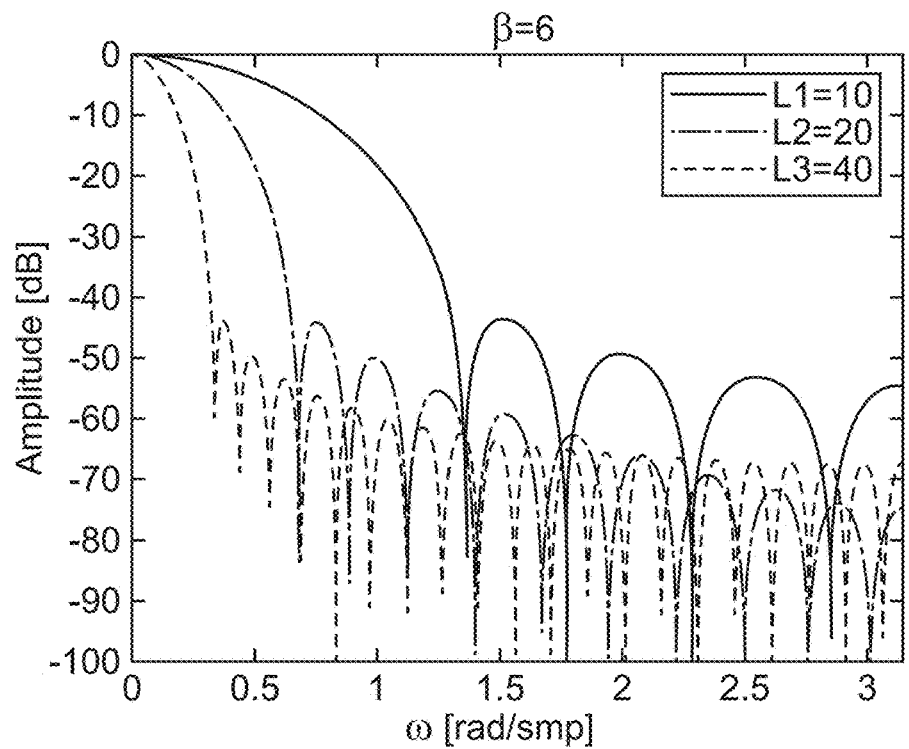
FIG. 4(b) is a plot diagram of respective impulse responses of Kaiser window functions in the frequency domain in accordance with one or more embodiments.

The parameter L represents the window duration in the time domain, and the impact of L on the transfer function in the frequency domain is that as L increases in time, the window gets narrower in frequency. This is illustrated by FIG. 4(b), which shows the transfer function of a Kaiser window in the frequency domain for different values of L (L=10, L=20, and L=40).

In one or more embodiments, different filter coefficients may be obtained for each block for interpolation in inter-picture prediction. the proposed interpolation filter may be a Kaiser-windowed Finite Impulse Response (FIR) filter with an adjustment of the bandwidth size.

For example, in some embodiments, a non-scaled filter impulse response g(i) of an interpolation filter that may be used according to the present subject disclosure is defined by the following formula, referred to herein as Equation 1:

$$g(i) = \left(\text{sinc}\left(\frac{\pi(i+p)}{D}\right) * rect(i)\right) \cdot w(i+p)$$

where i is a discrete time value, * represents a discrete convolution operator, defined by the following formula for the convolution of two discrete valued functions f and g:

$$f(i)*g(i)=\sum_{m=-\infty}^{\infty}f(m)\cdot g(i-m),$$

and · is the regular multiplication.

Further, the symbols used in Equation 1 are defined as follows:

Sinc is the cardinal sine function, which may be defined as:

$$\text{sinc}(x) = \lim_{t \to x}\frac{\sin(t)}{t};$$

D is a low-pass factor of the sinc function;
p is a fractional phase offset, which indicates a fractional pixel position;
rect(i) is a rectangular window function, with a width $w_{rect}$, designed to control motion blur by convoluting with the cardinal sine function. A suitable rectangular window function can be defined as follows:

$$rect(i) = \begin{cases} 1, & |i| \leq w_{rect} \\ 0, & \text{otherwise} \end{cases}$$

w is a windowing function, e.g. a Kaiser-windowing function, that is symmetric around zero and has a zero value outside the range of plus or minus L (2*L being the number of taps of the filter) and nonzero within that range, except possibly at the extreme boundaries. In some embodiments, the Kaiser window function may advantageously be used as it provides an adjustable window which can flexibly be configured for obtaining a desired band pass.

In signal processing, a filter having an impulse response using a cardinal sine function, usually known as a sinc filter, is typically used as a filter having an ideal response in that it removes all frequency components above a given cutoff frequency, without affecting lower frequencies, and with a linear phase response. The filter impulse response is a sinc function in the time domain, and its frequency response is a rectangular function. It is a so-called "ideal" low-pass filter in the frequency domain, as it passes frequencies below a cutoff frequency, and also cuts frequencies above the cutoff frequency. As illustrated on FIG. 5(a) the zero crossing of the first lobe depends on the argument of the sinc function. As the argument of the sinc function increases, the width of the first lobe decreases. Since the argument of sinc function used in our interpolation is inversely proportional to D, it can be concluded that as D increases, the width of sinc increases and the filter gets blurrier as shown in FIG. 6 cut and vice versa. Therefore in embodiments where interpolation filters that are blurrier than the conventional DCT-IF are desired, designs with a sinc function using the D parameter as argument with a value higher than that of the DCT-IF may be selected for building a set of predefined interpolation filters.

In one or more embodiments, a windowing function may advantageously be used in order to reduce the amplitude of frequency components that result from the use of discrete functions instead of continuous functions. Indeed, while the Fourier transform of a continuous cardinal sine function has a rectangular shape in the frequency domain with sharp frequency cut-off, the Fourier transform of a discrete cardinal sine function has a rectangular shape in the frequency domain with side lobes that correspond to noise with respect to the desired rectangular shape. A windowing function may then be used to attenuate such side lobes in the frequency domain.

Any suitable windowing function, preferably verifying the above criteria, may be used in the design of the filter impulse response. For example, the Kaiser window function may advantageously be used, as it adequately attenuates side lobes in the frequency domain.

In one or more embodiments, the non-scaled filter impulse response coefficients g(i) may be combined (e.g. summed) to obtain scaled values. For example, the coefficients g(i) may be summed in order to obtain the following scale value T:

$$T = \sum_{i=-L+1}^{L} g(i)$$

The floating-point filter impulse response may then be adjusted using the following formula to provide a DC gain equal to 1:

$$h(i) = \frac{g(i)}{T}$$

The set of h(i) coefficients represents the output of the interpolation filter determination in that it contains the values of the filter coefficients to be used to interpolate the current block at fractional pixel position p.

$$\text{sinc}\left(\frac{\pi(i+p)}{D}\right)$$

FIG. 6 shows plots of the sinc function in the time domain for three different values of D (D=1, D=1,5, and D=2). Each argument i+p corresponds to an integer argument i (i ∈{−4, −3, −2, −1,0,1,2,3,4}) to which a fractional value p (p ∈{0,0.25,0.5,0.75}) is added. As the argument of the sinc function increases, the width of the first lobe decreases. Therefore, since the argument of sinc function used in the proposed interpolation filter is inversely proportional to D, the width of sinc increases as D increases, and the width of sinc decreases as D decreases, as shown in FIG. 6.

A convolution with a rectangular window was introduced in Equation 1 in order to appropriately simulate the process of capturing the image (frame) by a camera. Indeed, the camera is not capable of capturing a single instant, so instead, what the camera actually does is integrate what it sees in a given period of time depending on shutter speed. It can be represented as a function:

$$F(x, y) = \int_0^{\Delta t} f(x, y, t)dt$$

where:
x, y represents a position of a pixel in an image;
F(x,y) represents the values of pixels after integration;
f(x, y, t) represents the integrable function of what the camera sees; and
Δt designates a period of time depending on the shutter speed.

When there is no motion in the scene captured by the camera, f(x, y, t) is approximately constant during the whole shutter time. However when there is motion in the scene captured by the camera, an integration for each value of a pixel is performed from the beginning of the shutter time until the end of the shutter time. The proposed interpolation filter of Equation 1 advantageously imitates this process via the convolution of the sinc function with a rectangular window.

Figure 5A:
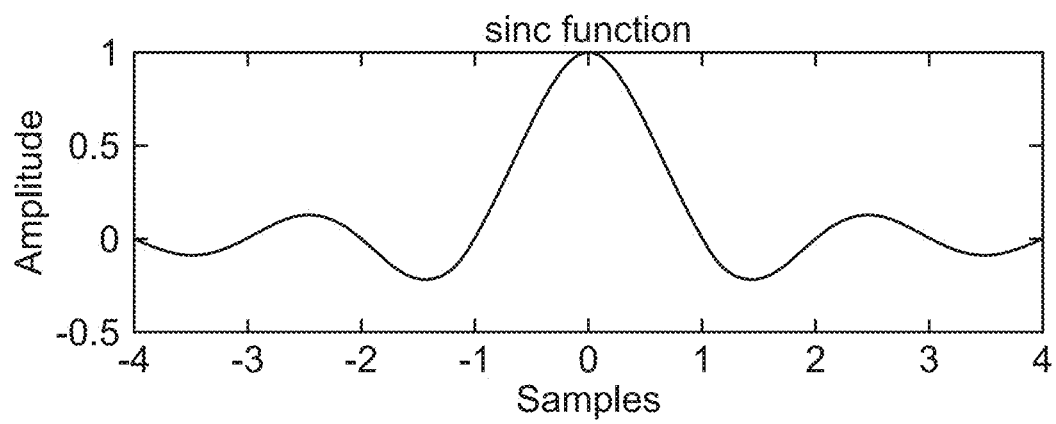
FIG. 5(a) is a plot diagram of a cardinal sine function in accordance with one or more embodiments.
Figure 5B:
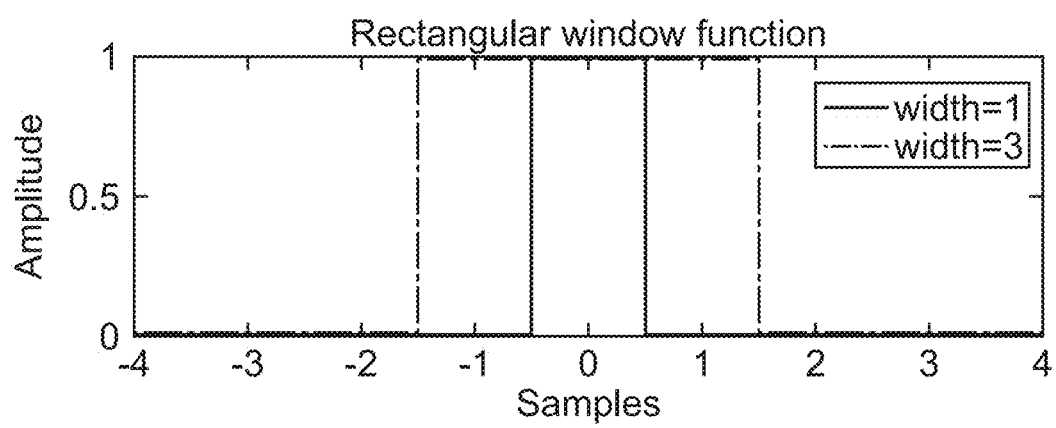
FIG. 5(b) is a plot diagram of rectangular window functions in accordance with one or more embodiments.
Figure 5C:
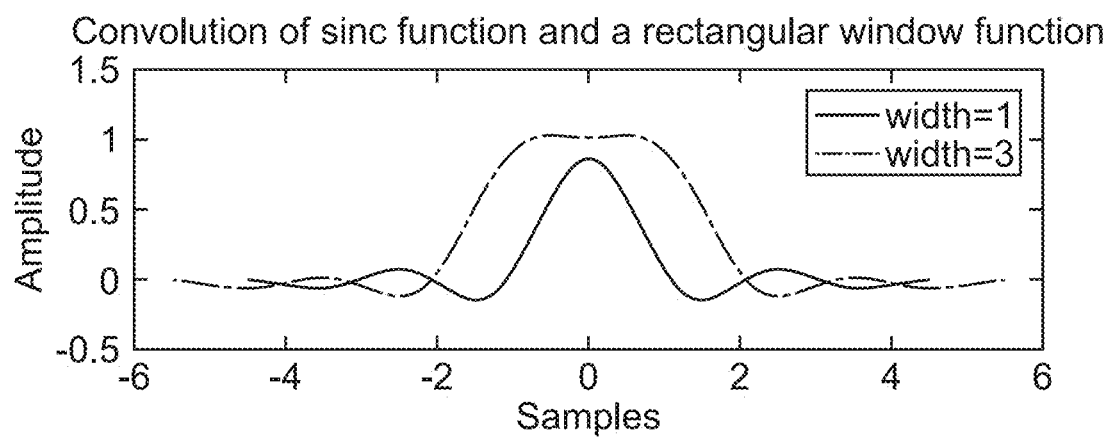
FIG. 5(c) is a plot diagram of convolutions of a cardinal sine function and a rectangular window function in accordance with one or more embodiments.
Figure 6:
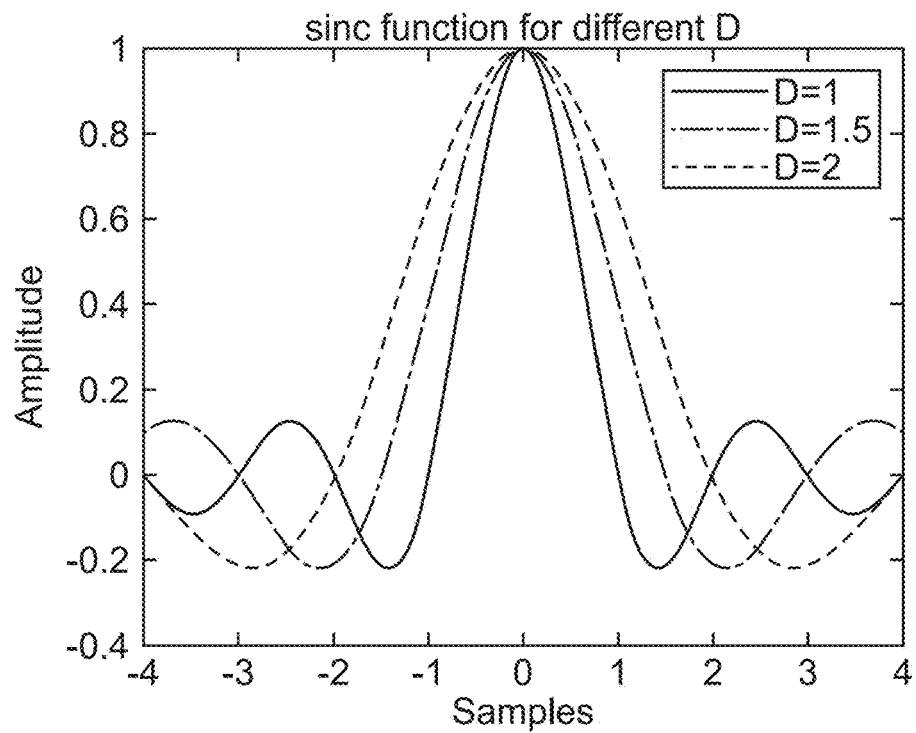
FIG. 6 is a plot diagram of a cardinal sine function in accordance with one or more embodiments.

The effect of convoluting a sinc function with a rectangular window is illustrated on FIGS. 5(a), 5(b) and 5(c).

FIG. 5(a) shows the plot of a $$\text{sinc}\left(\frac{\pi(i+p)}{D}\right)$$

function, each argument i+p corresponding to an integer argument i (i ∈{−4, −3, −2, −1,0,1,2,3,4}) to which a fractional value p (p ∈{0,0.25,0.5,0.75}) is added.

FIG. 5(b) shows the plot of a rectangular window function in the time domain, with two different width values: width=1, and width=3. The rectangular function of width equal to 1 may be defined as follows:

$$rect(i) = \begin{cases} 1, & |i| \leq 0.5 \\ 0, & \text{otherwise} \end{cases}$$

The rectangular function of width equal to 3 may be defined as follows:

$$rect(i) = \begin{cases} 1, & |i| \leq 1.5 \\ 0, & \text{otherwise} \end{cases}$$

FIG. 5(c) shows respective plots of the convolution of the sinc function of FIG. 5(a) with the rectangular functions of FIG. 5(b), that is, the convolution of the sinc function with a rectangular window function for two different widths of the rectangular window function.

As can be seen on FIG. 5(c), when $w_{rect}$ is large (for example in the case where $w_{rect}=3$), the resulting filter cuts off higher frequencies and hence blurs out the prediction. As $w_{rect}$ gets smaller (for example in the case where $w_{rect}=1$), the filter sharpens the prediction.

In one or more embodiments, the proposed process further takes into account the GOP (Group of Pictures) structure used as encoding configuration. For example, generally sharper interpolation filters have shown better gains for RA (Random Access) configurations, but generally smoother interpolation filters have shown better results for LD (Low Delay) configurations. Therefore one interpolation filter definition might not be suitable for all configurations. To address this problem, in one or more embodiments, the type of frame (image) or its position in the corresponding GOP may be taken into account for defining a subset of interpolation filters suitable for being used for all blocks of the current image/frame.

In one or more embodiments, filters suitable for use as interpolation filter may be obtained for generating a set of predefined interpolation filters to be used according to the present subject disclosure. As discussed above, using a plurality of interpolation filters allows selecting the filter to be used for processing a current block based on performances obtained with the selected filter for processing the current block, for example an improved coding gain for encoding the current block.

As the conventional DCT-IF filter is widely recognized as an interpolation filter providing good performances, the set of predefined interpolation filters may comprise in some embodiments the DCT-IF filter.

In one or more embodiments, a set of predefined interpolation filters is generated, for example with the conventional DCT-IF filter and alternative interpolation filter designs, for example based on the above-described filter designs. In some embodiments, once the set of predefined filters is generated, for example with the DCT-IF filter and other filters (sometimes referred to in the present disclosure as "alternative" filters, while the DCT-IF filter may be referred to as the "standard" filter), the filters of the set may be integrated into a video codec in order to be tested for respective performances.

In some embodiments, the set of predefined filters and/or the codec may be configured so that DCT-IF filter performances are compared with that of the alternative filters.

The filters of the set of predefined filters may then be tested with a set of images. Each image of the test set may further be subjected to the selected encoding process, and may as part of this process be divided into blocks. For each block of a current test image (image being encoded), a distortion may be computed for each of the interpolation filters to be tested, in order to obtain a level of performances for each filter with respect to each block of each image of the test set.

Distortion may be computed based on various metrics, such as the «Sum of Absolute Differences» (SAD), or the «Mean Square Error» (MSE). For example, the motion estimation may in some embodiments comprise a search in a search area of a reference image that has already been processed (e.g. encoded) in order to test the correlation between the current block with a predefined set of blocks in the reference image. The correlation between a current block and its motion according to a motion vector can be estimated using the following SAD criterion:

$$SAD = \Sigma_x \Sigma_y |p_{xy} - p'_{xy}| \quad (1)$$

Wherein $p_{xy}$ is the pixel at position (x, y) of the block in the reference image corresponding to the current block, and $p'_{xy}$ is the pixel at position (x, y) of the reference block. A low SAD may then be used to determine that the two blocks are well correlated.

In one or more embodiments, an interpolation filter may be selected for each block of each image of the test set, based on the computation of the distortion calculated for each of the candidate interpolation filters, for example by selecting the filter that presents the lowest SAD for the block.

A learning database can then be obtained with, for one or more of the tested blocks of each tested image of the test set, the data corresponding to the tested block associated with data related to the interpolation filter chosen for the tested block. Use of the learning database for training and validating a chosen supervised learning algorithm may be referred to in the following as the "oracle mode", and is described hereinafter.

The past decade has witnessed the emerging and success of deep learning, a class of techniques that are progressively adopted in the hope of approaching the ultimate goal of artificial intelligence. Deep learning belongs to the field of machine learning technology, in which its specificity lies in its computational models. Examples of computational models include so-called "artificial neural networks" (ANN) (in particular "deep artificial neural networks") and so-called "convolutional neural networks" (CNN). Deep artificial neural networks typically comprise multiple (usually more than three) processing layers, each layer comprising multiple, usually non-linear, so-called "basic" computational units. CNNs are feed-forward, multi-layer neural networks, typically structured into a feature extraction stage followed by an inference stage. The feature extraction stage includes a number of convolutional layers, each encompassing a number of learnable filters. Each filter activates upon the detection of one specific feature in the input. The output of the feature extraction stage is processed by one or more fully-connected layers, with the actual number of layers and learnable parameters in each layer depending on the specific application. Finally, the last layer of the network provides the desired network output such as the class an object belongs to (classification problems) which corresponds to the case considered in this document or the object position in the image (regression problems). The abilities to process data with multiple levels of abstraction and to convert data into different kinds of representations is one of the recognized benefits of deep artificial neural networks. These representations are not usually manually designed, as the deep network including the processing layers is usually learned from massive data using a so-called "general machine learning" or "training phase" procedure. As deep learning may eliminate the necessity of handcrafted representations, deep learning using convolutional neural network has been considered as a scheme that would advantageously allow avoiding the need for signaling used interpolation filter(s).

Integrating deep learning technology into a video coding scheme can be addressed using two different categories of deep learning schemes. The first category consists of so-called "deep schemes", i.e. new coding schemes that are built primarily upon deep networks, while the second category comprises so-called "deep tools", i.e. deep network-based coding tools that are embedded into traditional, non-deep coding schemes. Advantageously, a deep tool may either replace its counterpart in the traditional scheme, or be newly added into the scheme. The schemes proposed according to the present disclosure correspond to the second category, and use a newly proposed deep tool used to select interpolation filters in a set of predefined interpolation filters.

In one or more embodiments, deep learning techniques are used, for example by configuring a CNN selected according to one or more characteristics of a pixel block, such as its size and/or its shape. For example, in some embodiments, a CNN may be configured based on a block size characteristic of a current block, by receiving as input data the pixels of the motion compensated block from the reference image for the current block, so as the CNN selects as output the interpolation filter that is considered optimum for the current block further to the performed tests of interpolation filters.

Accordingly, the present subject disclosure suggests that artificial neural networks may advantageously be used to predict an optimum filter to be chosen in the interpolation process of a video compression scheme, for example at the level of the block.

The proposed scheme can in some embodiments advantageously further provide normativity, according to which a same interpolation filter is predicted by a supervised learning algorithm used at the encoder and at the decoder. In particular, in some embodiments, the proposed scheme may be used to determine, through the output of a supervised learning algorithm used at the encoder and at the decoder, a same interpolation filter index in a set of predefined interpolation filters. For this purpose, in some embodiments, the same input data of the neural networks may be used at both sides (encoding and decoding sides).

For example, in some embodiments, the input data related to the current block that are input to the supervised learning algorithm may comprise pixels of an so called "application area", for example comprising a set of at least one pixel in at least one pixel block of the first image, wherein the at least one pixel block has already been processed according to a processing sequence defined for the first image.

In one or more embodiments, for a current pixel block being processed, an application area may be determined, as a set of pixels based on which data related to the current block to be fed to the supervised learning algorithm may be generated. In some embodiments, the application area may comprise a set of pixels in blocks preceding the current block in the processing sequence. In some embodiments where the encoding of blocks involves the decoding, at the encoder, of previously encoded blocks, the application area may be chosen to comprise a plurality of pixels belonging to blocks that have already been encoded (and therefore decoded). In some embodiments, the application area may be limited to one pixel. In other embodiments, the application area may comprise several pixels.

The pixel(s) of the application area may be chosen to be pixels located immediately around pixels of the current block. In some embodiments, the number of pixels of the application area may be dynamically chosen based on one or more characteristics, such as the size (number of pixels) and/or the shape, of the current block.

As another example, in some embodiments, the input data related to the current block that are input to the supervised learning algorithm may comprise pixels from a motion compensated block in a reference image. In some embodiments, a motion compensated block will be a block of the reference image that corresponds to the current block after motion compensation, i.e. a block with a location in the reference image that is the same as the location of the current block in the image being processed.

Therefore, depending on the embodiment, data input to the supervised learning algorithm used at both the encoder side and the decoder side may include pixels from a motion compensated block in a reference image, or so called "causal" pixels from an available (in that pixels in that area have already been encoded/decoded and are therefore available) neighboring area of the current block.

This choice of input data advantageously allows leveraging the existing temporal correlation between the pixels of the current block and the motion compensated block, and/or the existing spatial correlation between the current block and its neighboring causal pixels.

In one or more embodiments, a neural network configured with the chosen supervised learning algorithm may be trained during a learning phase, which may also sometimes be referred to as a "training phase", in order to ensure that normative interpolation filter predictions can be obtained, that is, that the same interpolation filter is obtained both at the encoder side and at the decoder side once the algorithm is used for processing (e.g. encoding and decoding) blocks of an input image.

In one or more embodiments, the above-described oracle mode may advantageously be used during the learning phase. As described above, a previously generated database comprising data related to processed blocks and data related to respectively associated interpolation filters determined as optimum for each block may be provided as the source of the learning phase.

During the learning phase, the neural network under training may be supplied with learning data comprising, for each of a plurality of image blocks, a known output (interpolation filter that was selected as being optimum for the block) that should be selected for a given input (data related to a block, for example comprising values of the pixels of the block). The deep learning scheme used may therefore be considered a supervised learning scheme.

In one or more embodiments, the data of the learning database may be partitioned into two subsets, one subset being used for training the neural network model (training data subset), and another subset being used for validating the model (validating data subset). In that manner, the second subset (validating data subset) may be used to validate the output of the model under training and keep track of its performances. In other words, the learning phase may be divided into a training phase per se and a validation phase. During the training phase, the model will typically learn to find the relation between the pixels of a given input and a filter also provided as input, and during the validation phase the model will typically learn to apply what it has learned during the training phase, as data related to the interpolation filter associated with a block stored in the validating data subset will not be provided to the model during the validation phase, but instead used to measure its performances.

Preferably, the validation data subset may comprise one or more video sequences that are different from video sequences comprised in the training data subset. The training data subset may preferably comprise a wide variety of contents, so as to improve the ability of the constructed model to handle a variety of contents with satisfactory performances and with consistency when handling different contents.

During the validation phase, a predefined performance function may be used to measure the distance (in some embodiments measured as an error) between the output generated by the model and the desired pattern of output. The measured distance (e.g. error) may then be fed back to the supervised learning algorithm (model) so that it modifies its internal adjustable parameters to optimize the performance function (e.g. achieve a minimum of the error). Such adjustable parameters may sometimes be referred to as "weights". To properly adjust a weight vector, the supervised learning algorithm will typically be configured to compute a gradient vector that, for each weight, indicates by what amount the error would change if the weight were modified. The weight vector may then be adjusted in the opposite direction to the gradient vector. In some embodiments, the objective function may be optimized by using an iterative method such as, for example, the Stochastic Gradient Descent method.

Exemplary embodiments of the proposed method are described in the following.

Depending on the embodiments, several interpolation filters may be generated based on the generic design described above, which may be based on Equation 1 above, by varying the factors and/or coefficients of Equation 1, such as the Kaiser window or parameters thereof, the values of parameters L and β, and/or the low-pass factor D of the sinc function.

Figure 7:
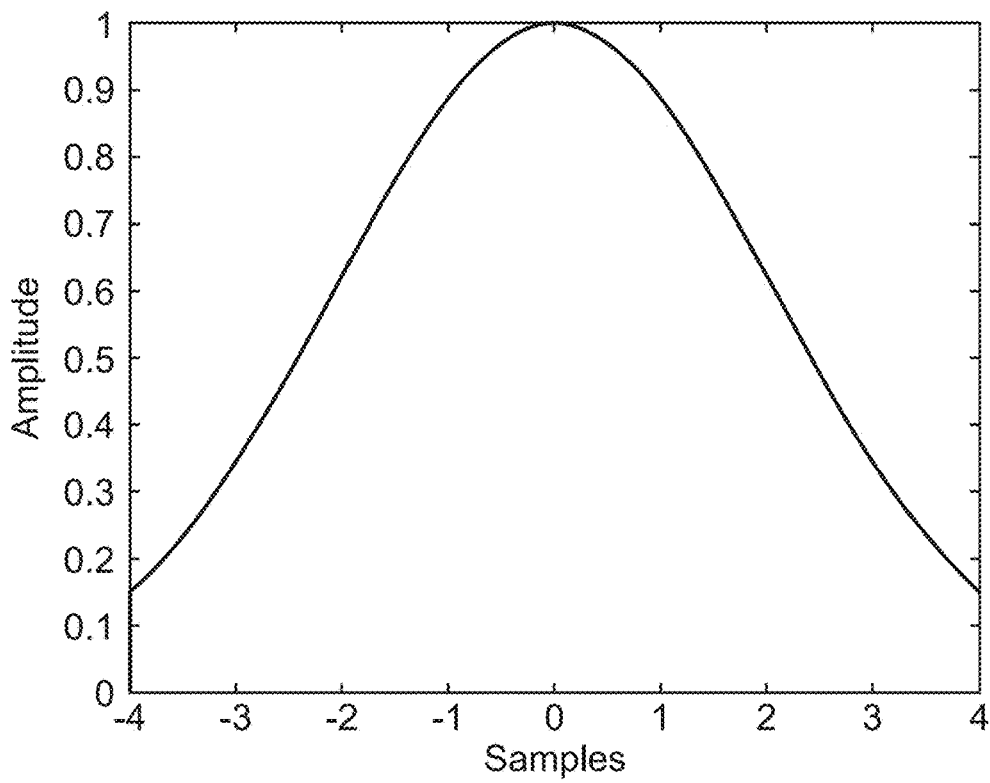
FIG. 7 is a plot diagram of a transfer function of a Kaiser window in accordance with one or more embodiments.

In some embodiments, a constant Kaiser window function may be used with parameters L=4 and β=3 in order to obtain the filter that is closest to a Gaussian filter, as the Gaussian filter usually provides good performances when used for interpolation. This Kaiser window function is symmetric around 0 and does not have zero values for bandwidth values −4 and 4. This can be seen in the graph of the impulse response presented in FIG. 7.

In some embodiments, the transfer function formula adopted for generating an interpolation filter may be obtained as a product of a sinc function with a Kaiser window function, which corresponds to the specific case of Equation 1 wherein rect is chosen to be a Dirac delta function. The transfer function of an alternative interpolation filter may therefore be given by the following formula (Equation 2), where the functions and parameters correspond to that described above in connection with Equation 1:

$$g(i) = \mathrm{sinc}\left(\frac{\pi(i+p)}{D}\right) \cdot w(i+p)$$

As discussed above, interpolation filters may be obtained based on the above formula, with Kaiser window parameters set as L=4 and β=3. The value of the low-pass factor D may also be tuned to obtain desired interpolation results (leading to compression gains). Setting the factor D to a value of 1 leads to a filter which may be considered too similar to the DCT-IF filter. Therefore the value of D may advantageously be chosen strictly superior to 1 in order to generate filters that are blurrier than the DCT-IF filter.

With respect to selecting a CNN to be used according to the present subject disclosure, several examples of CNN could be used to predict the filter index, such as, for instance the Lenet5, vgg16, Mobilenet and/or Resnet for blocks of a large size, and Multi-Layer Perceptron (MLP) for small blocks. Depending on the embodiment, these networks may be applied on all block sizes, or selectively on a respective subgroup of block sizes.

Depending on the one or more CNN chosen for using the proposed method, it may be useful to reserve the use of certain types of CNN for specific block size. Indeed, CNN with a relatively small number of layers may not be very well suited for handling the prediction of large blocks with satisfactory performances, while providing a good computation time over complexity ratio for smaller blocks. In such case it may be advantageous to use different CNN for large blocks and for small to medium sized blocks.

In some embodiments, different block sizes may be investigated in order to determine a set of block sizes which cumulatively provide most of the total gain of the proposed method. For example, a statistical study may be performed to determine the block sizes that are mainly behind the gains of the proposed method. This advantageously allows using the proposed method only for the block sizes which have been identified as granting the largest gains, so that the proposed method may not be used for blocks of a size which has been identified as providing a smaller gain of the proposed method. This advantageously allows selectively operating the proposed method according to a computation complexity vs gain ratio, and makes it possible to adjust a computation complexity vs gain compromise based on the computation power of the apparatus on which the proposed method is to be used, so as to preserve the resources (computational, battery) of such apparatus.

As discussed above, in some embodiments the transfer function of an alternative interpolation filter may be chosen to be given by multiplying a sinc function with the Kaiser window. In some embodiments, the sinc function used in the transfer function may be convoluted in the time domain with a Rectangular window.

The formula for the transfer function of a possible interpolation filter may therefore be:

$$g(i) = \left(\mathrm{sinc}\left(\frac{\pi(i+p)}{D}\right) * \mathrm{rect}(i)\right) \cdot w(i+p)$$

where "*" represents a convolution operation and "·" represents a regular multiplication operation.

In one or more embodiments, two interpolation filters may be comprised in the set of predefined interpolation filters: the first filter may be an alternative filter as described below, and the second filter may be the standard DCT-IF.

Figure 8A:
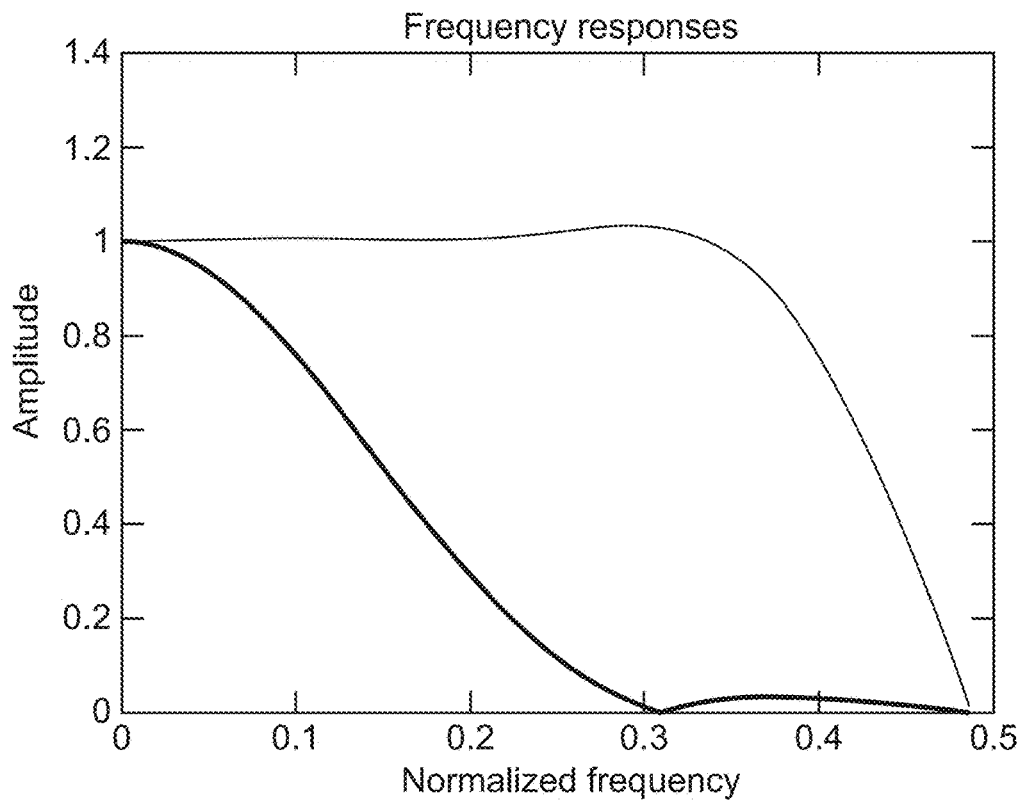
FIG. 8(a) is a plot diagram of a transfer functions of a DCT-IF and a proposed Gaussian filter for half sample precision in accordance with one or more embodiments.
Figure 8B:
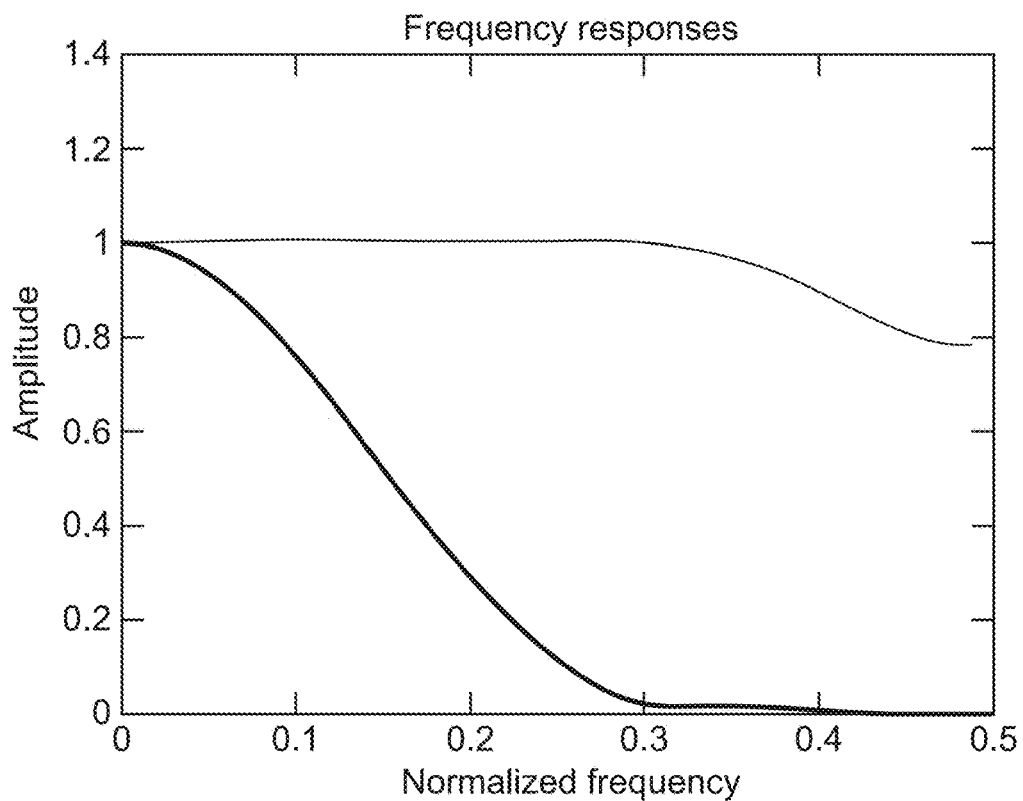
FIG. 8(b) is a plot diagram of a transfer functions of a DCT-IF and a proposed Gaussian filter for half sample precision in accordance with one or more embodiments.

For design of the alternative filter, the above-described method may be used with D=3. Note that setting D to 1 would lead to a filter very similar to DCT-IF. AS discussed above, based on the relation between the value of D and the blurriness of the filter, D may be chosen as much large as blurry a desired filter, the filter gets blurrier as D increases. FIGS. 8(a) and 8(b) emphasize the impact of D on the frequency responses of the filters. By replacing p with desired pel precision, we could obtain for the half and the quarter pel, two filters corresponding to the gaussian function. FIG. 8(a) illustrates for the half sample precision the differences of the frequency responses between a DCT-IF (top curve) and the proposed Gaussian filter described above (bottom curve, bold line). Similarly, FIG. 8(b) illustrates for the quarter sample precision the difference between the DCT-IF (top curve) and the proposed Gaussian filter (bottom curve, bold line). The coefficients of exemplary interpolation filters for luma samples for the proposed Gaussian filter can be seen in the following Table 4:

TABLE 4

Luma interpolation filter coefficients for an exemplary proposed Gaussian filter in accordance with one or more embodiments

| Frac | Proposed Gaussian filter coefficients |
|---|---|
| 0 | {0, 0, 0, 64, 0, 0, 0, 0} |
| 1 | {0, 1, −3, 63, 4, −2, 1, 0} |
| 2 | {−1, 2, −5, 62, 8, −3, 1, 0} |
| 3 | {−1, 3, −8, 60, 13, −4, 1, 0} |
| 4 | {0, 4, 13, 20, 18, 8, 1, 0} |
| 5 | {−1, 4, −11, 52, 26, −8, 3, −1} |
| 6 | {−1, 3, −9, 47, 31, −10, 4, −1} |
| 7 | {−1, 4, −11, 45, 34, −10, 4, −1} |
| 8 | {0, 2, 11, 19, 19, 11, 2, 0} |
| 9 | {−1, 4, −10, 34, 45, −11, 4, −1} |
| 10 | {−1, 4, −10, 31, 47, −9, 3, −1} |
| 11 | {−1, 3, −8, 26, 52, −11, 4, −1} |
| 12 | {0, 1, 8, 18, 20, 13, 4, 0} |
| 13 | {0, 1, −4, 13, 60, −8, 3, −1} |
| 14 | {0, 1, −3, 8, 62, −5, 2, −1} |
| 15 | {0, 1, −2, 4, 63, −3, 1, 0 } |

From Table 3 (DCT-IF filter) and Table 4 (proposed Gaussian filter), it is noticeable that only the coefficients of the quarter (frac=4 and frac=12) and half (Frac=8) pel precisions differ. All the other precisions may be kept the same.

As discussed above, different block sizes may be investigated in order to determine a set of block sizes which cumulatively provide most of the total gain of the proposed method.

For example, in some embodiments, 5 block sizes may be chosen as providing the highest gains. With the above-described filter design, one may be lead to select the following block sizes: 8×8, 16×16, 16×32, 32×16 and 32×32, as it may be determined that such block sizes together ensure 70% of the total gains. That is, assuming a neural network which is 100% accurate, 70% of the total gains (that would be achieved by using the proposed method for all block sizes) would be obtained in the oracle mode. A simple neural network, such as LeNet-5, may be used to find the best trade-off between the simplicity, the complexity imposed on the codec and the prediction accuracy achieved. Therefore Lenet-5 may in one or more embodiments be used on the blocks 16×16, 16×32, 32×16 and 32×32, while a Multi-Layer Perceptron (MLP) may be applied on 8×8 blocs. For example, the proposed method may be implemented with a set of predefined interpolation filters comprising the DCT-IF filter and the above-described filter designed according to Equation 2, and with the different neural networks (e.g. Lenet-5 and MLP) using as input luminance pixels of a motion compensated block from a reference frame.

The present subject disclosure proposes schemes which advantageously allow reducing the coding rate of a consistently quality video. Some embodiments advantageously adapt the interpolation filtering process to the content and the local characteristics of the image at a fine granularity. In some embodiments, the result may be a different set of coefficients per block, giving a more accurate prediction, meaning less energetic residuals and hence, less data to transmit.

In the proposed Smart Alternative Interpolation Filters (SAIF) mode according to the present subject disclosure, there is no need to send to a decoder the index of the filter chosen for each block. Instead, the optimum interpolation filter is derived at both the encoding side and the decoding side using deep artificial neural networks.

The proposed method may be used for the processing, for purposes of encoding or compression, or decoding or decompression, of input video data.

While the disclosure has been described with respect to preferred embodiments, those skilled in the art will readily appreciate that various changes and/or modifications can be made to the disclosure without departing from the spirit or scope of the disclosure as defined by the appended claims.

Although this disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method of processing a first image in a first plurality of images, wherein the first image is divided into a plurality of pixel blocks, the method comprising, for a current block of the first image:
selecting, in a set of a plurality of predefined interpolation filters, a first interpolation filter based on a first prediction of an interpolation filter determined by a supervised learning algorithm to which data related to the current block is input; and
using the selected first interpolation filter for calculating fractional pixel values in a second image of the plurality of images for a temporal prediction of pixels of the current block based on a reference block correlated to the current block in the second image,
wherein the second image is distinct from the first image and was previously encoded according to an image encoding sequence for encoding the images of the plurality of images,
wherein the method further comprises a learning phase of a neural network performed on a second set of images,
wherein the learning phase comprises, for a current block of a current image of the second set of images:
selecting, in the set of the plurality of predefined interpolation filters, an interpolation filter based on a distortion criterion calculated for the current block; and
performing training of the neural network based on data related to the current block and the selected interpolation filter.

2. The method according to claim 1, further comprising:
selecting, based on a first characteristic of the current block, a subset of interpolation filters in a set of predefined interpolation filters,
wherein the subset of interpolation filters is input to the supervised learning algorithm for determining the first prediction of the interpolation filter, and
wherein the first characteristic is obtainable based on the data related to the current block input to the supervised learning algorithm.

3. The method according to claim 1, further comprising:
selecting, based on a second characteristic of the current block, the supervised learning algorithm.

4. The method according to claim 2, wherein each of the first and second characteristics of the current block comprises one or more of a size of the current block, and a shape of the current block.

5. The method according to claim 1, wherein the input data related to the current block comprise pixels of an application area comprising a set of at least one pixel in at least one pixel block of the first image,
wherein the at least one pixel block has already been processed according to a processing sequence defined for the first image.

6. The method according to claim 1, wherein the input data related to the current block comprise pixels from a motion compensated block in the second image.

7. The method according to claim 1, wherein the determining of the first prediction of interpolation filter is based on an identifier in the set of predefined interpolation filters output by the supervised learning algorithm.

8. The method according to claim 1, wherein the supervised learning algorithm is a gradient-based learning algorithm.

9. The method according to claim 1, wherein the set of predefined interpolation filters comprises a plurality of low-pass filters with respective cut-off frequencies.

10. The method according to claim 1, further comprising:
selecting, in the set of the plurality of predefined interpolation filters, a second interpolation filter based on a second prediction of an interpolation filter determined by the supervised learning algorithm to which data related to the current block is input;
using the selected second interpolation filter for calculating fractional pixel values in a third image of the plurality of images in a second direction for a temporal prediction of pixels of the current block in the second direction based on a reference block correlated to the current block in the third image, wherein the third image is distinct from the first image and was previously encoded according to the image encoding sequence, wherein the selected first interpolation filter is used for calculating the fractional pixel values in the second image in a first direction for a temporal prediction of pixels of the current block in the first direction, and wherein the first direction is distinct from the second direction.

11. The method according to claim 1, wherein the supervised learning algorithm is a convolutional neural network learning algorithm.

12. An apparatus comprising a processor and a memory operatively coupled to the processor, wherein the apparatus is configured to perform a method of processing a first image in a first plurality of images, wherein the first image is divided into a plurality of pixel blocks, and the method comprises, for a current block of the first image:

selecting, in a set of a plurality of predefined interpolation filters, a first interpolation filter based on a first prediction of an interpolation filter determined by a supervised learning algorithm to which data related to the current block is input; and using the selected first interpolation filter for calculating fractional pixel values in a second image of the plurality of images for a temporal prediction of pixels of the current block based on a reference block correlated to the current block in the second image, wherein the second image is distinct from the first image and was previously encoded according to an image encoding sequence for encoding the images of the plurality of images, wherein the method further comprises a learning phase of a neural network performed on a second set of images, wherein the learning phase comprises, for a current block of a current image of the second set of images:

selecting, in the set of the plurality of predefined interpolation filters, an interpolation filter based on a distortion criterion calculated for the current block; and performing training of the neural network based on data related to the current block and the selected interpolation filter.

13. The apparatus according to claim 12, wherein the apparatus is further configured to perform the steps:

selecting, based on a first characteristic of the current block, a subset of interpolation filters in a set of predefined interpolation filters, wherein the subset of interpolation filters is input to the supervised learning algorithm for determining the first prediction of the interpolation filter, and wherein the first characteristic is obtainable based on the data related to the current block input to the supervised learning algorithm.

14. The apparatus according to claim 12, wherein the apparatus is further configured to perform the step of: selecting, based on a second characteristic of the current block, the supervised learning algorithm.

15. The apparatus according to claim 13, wherein each of the first and second characteristics of the current block comprises one or more of a size of the current block, and a shape of the current block.

16. A non-transitory computer-readable medium encoded with executable instructions which, when executed, causes an apparatus comprising a processor operatively coupled with a memory, to perform a method of processing a first image in a first plurality of images, wherein the first image is divided into a plurality of pixel blocks, and the method comprises, for a current block of the first image:

selecting, in a set of a plurality of predefined interpolation filters, a first interpolation filter based on a first prediction of an interpolation filter determined by a supervised learning algorithm to which data related to the current block is input; and using the selected first interpolation filter for calculating fractional pixel values in a second image of the plurality of images for a temporal prediction of pixels of the current block based on a reference block correlated to the current block in the second image, wherein the second image is distinct from the first image and was previously encoded according to an image encoding sequence for encoding the images of the plurality of images, wherein the method further comprises a learning phase of a neural network performed on a second set of images, wherein the learning phase comprises, for a current block of a current image of the second set of images:

selecting, in the set of the plurality of predefined interpolation filters, an interpolation filter based on a distortion criterion calculated for the current block; and performing training of the neural network based on data related to the current block and the selected interpolation filter.

17. The non-transitory computer-readable medium according to claim 16, wherein the executable instructions further cause the apparatus to perform the steps:

selecting, based on a first characteristic of the current block, a subset of interpolation filters in a set of predefined interpolation filters, wherein the subset of interpolation filters is input to the supervised learning algorithm for determining the first prediction of the interpolation filter, and wherein the first characteristic is obtainable based on the data related to the current block input to the supervised learning algorithm.

18. The non-transitory computer-readable medium according to claim 16, wherein the executable instructions further cause the apparatus to perform the step: selecting, based on a second characteristic of the current block, the supervised learning algorithm.

19. The non-transitory computer-readable medium according to claim 17, wherein each of the first and second characteristics of the current block comprises one or more of a size of the current block, and a shape of the current block.

* * * * *